(12) United States Patent
Senecal et al.

(10) Patent No.: US 11,368,483 B1
(45) Date of Patent: *Jun. 21, 2022

(54) LOW TOUCH INTEGRATION OF A BOT DETECTION SERVICE IN ASSOCIATION WITH A CONTENT DELIVERY NETWORK

(71) Applicant: Akamai Technologies, Inc., Cambridge, MA (US)

(72) Inventors: David Senecal, Santa Clara, CA (US); Prajakta Bhurke, Santa Barbara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/273,216

(22) Filed: Feb. 12, 2019

Related U.S. Application Data

(60) Provisional application No. 62/629,859, filed on Feb. 13, 2018.

(51) Int. Cl.
*H04L 29/06* (2006.01)
*H04L 9/40* (2022.01)
*G06F 16/958* (2019.01)

(52) U.S. Cl.
CPC ........ *H04L 63/1466* (2013.01); *G06F 16/958* (2019.01); *H04L 63/1425* (2013.01); *H04L 63/1433* (2013.01)

(58) Field of Classification Search
CPC ............. H04L 63/1466; H04L 63/1425; H04L 63/1433; G06F 16/958
See application file for complete search history.

(56) References Cited

U.S. PATENT DOCUMENTS 7,895,653 B2  2/2011  Calo et al.
8,433,785 B2  4/2013  Awadallah et al.
(Continued)

OTHER PUBLICATIONS

Xi, Rongrong, et al. "Network threat assessment based on alert verification." 2011 12th International Conference on Parallel and Distributed Computing, Applications and Technologies. IEEE, 2011. (Year: 2011).*

(Continued)

*Primary Examiner* — Joseph P Hirl
*Assistant Examiner* — Ka Shan Choy
(74) *Attorney, Agent, or Firm* — David H. Judson

(57) ABSTRACT

A server interacts with a bot detection service to provide bot detection as a requesting client interacts with the server. In an asynchronous mode, the server injects into a page a data collection script configured to record interactions at the requesting client, to collect sensor data about the interactions, and to send the collected sensor data to the server. After the client receives the page, the sensor data is collected and forwarded to the server through a series of posts. The server forwards the posts to the detection service. During this data collection, the server also may receive a request from the client for a protected endpoint. When this occurs, and in a synchronous mode, the server issues a query to the detection service to obtain a threat score based in part on the collected sensor data that has been received and forwarded by the server. Based on the threat score returned, the server then determines whether the request for the endpoint should be forwarded onward for handling.

13 Claims, 21 Drawing Sheets

(56) References Cited

U.S. PATENT DOCUMENTS

| | | |
|---|---|---|
| 8,613,089 B1 | 12/2013 | Holloway et al. |
| 8,689,328 B2 | 4/2014 | Ormazabal et al. |
| 8,966,625 B1 * | 2/2015 | Zuk ...................... H04L 63/145 |
| | | 709/227 |
| 9,071,592 B1 | 6/2015 | Oakes et al. |
| 9,294,498 B1 * | 3/2016 | Yampolskiy .......... G06F 21/577 |
| 9,420,049 B1 | 8/2016 | Talmor et al. |
| 9,516,058 B2 | 12/2016 | Antonakakis et al. |
| 9,680,850 B2 | 6/2017 | Rapaport et al. |
| 9,724,824 B1 | 8/2017 | Annan et al. |
| 9,762,596 B2 * | 9/2017 | Wang .................. H04L 63/1416 |
| 9,838,407 B1 | 12/2017 | Oprea et al. |
| 10,270,792 B1 | 4/2019 | Shemesh |
| 10,491,697 B2 | 11/2019 | Wang et al. |
| 10,565,385 B1 * | 2/2020 | Ravi ...................... G06F 21/552 |
| 10,587,629 B1 | 3/2020 | Kurupati et al. |
| 10,673,719 B2 | 6/2020 | Niv |
| 10,826,920 B1 | 11/2020 | Lin |
| 2005/0216845 A1 | 9/2005 | Wiener |
| 2008/0301808 A1 | 12/2008 | Calo et al. |
| 2010/0281539 A1 * | 11/2010 | Burns ................. H04L 63/1441 |
| | | 726/13 |
| 2011/0208714 A1 | 8/2011 | Soukal et al. |
| 2012/0054869 A1 | 3/2012 | Yen et al. |
| 2014/0241519 A1 | 8/2014 | Watson et al. |
| 2014/0379902 A1 | 12/2014 | Wan et al. |
| 2016/0057163 A1 | 2/2016 | Boffa et al. |
| 2016/0191554 A1 | 6/2016 | Kaminsky |
| 2016/0241579 A1 | 8/2016 | Roosenraad et al. |
| 2016/0359900 A1 * | 12/2016 | Crisler ................ H04L 63/1425 |
| 2017/0185758 A1 | 6/2017 | Oliker et al. |
| 2017/0257385 A1 | 9/2017 | Overson et al. |
| 2018/0288063 A1 * | 10/2018 | Koottayi ............... H04L 63/102 |
| 2018/0343272 A1 | 11/2018 | Khalil et al. |
| 2019/0014155 A1 | 1/2019 | Synal |

OTHER PUBLICATIONS

Office action dated Feb. 23, 2021, U.S. Appl. No. 16/273,219.
Office action dated Feb. 26, 2021, U.S. Appl. No. 16/273,223.
U.S. Appl. No. 16/273,219, Notice of Allowance dated Sep. 9, 2021.
U.S. Appl. No. 16/273,223, Office action dated Oct. 21, 2021.

* cited by examiner

LOW TOUCH INTEGRATION OF A BOT DETECTION SERVICE IN ASSOCIATION WITH A CONTENT DELIVERY NETWORK

BACKGROUND

Technical Field

This application relates generally to protecting websites and mobile applications (apps) from automated attacks by scripts or bots.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

It is known to provide a JavaScript-based technology to fingerprint clients and collect telemetry to evaluate the user behavior and differentiate bots from humans. —Among other uses, this technology is useful to protect transactional workflows such as login, checkout, search, gift card validation, coupons/rebates processing, etc., and that are regularly the target of fraud activity using botnets.

BRIEF SUMMARY

This disclosure describes techniques by which an overlay network edge server interacts with a bot detection service to provide active bot detection as a requesting client interacts with the overlay network edge server. In a typical interaction, and upon initiation of a session between a requesting client and the overlay network edge server, the edge server sets a long-term cookie and a short-term cookie in association with returning a page (typically, a base HTML page) to the requesting client. In an asynchronous mode of operation, the edge server injects into that page a reference to a data collection script. The script is configured to record one or more interactions at the requesting client, to collect sensor data about the interactions, and to send the collected sensor data from the requesting client back to the edge server. After the client receives the page and instantiates the script locally, the sensor data is collected and forwarded back to the edge server through a series of automatic posts (e.g., JSON-formatted POST requests), wherein a particular post typically is associated with a behavioral action occurring locally at the requesting client. The edge server then forwards the posts onward to the bot detection service (via a service API) to enable the service to evaluate whether the requesting client is a human or a bot. During this asynchronous mode of data collection, the edge server may then receive a request for the protected endpoint. When this occurs, and in a synchronous mode of operation, the edge server issues a query to the bot detection service to obtain a threat score associated with the requesting client. The threat score typically is based at least in part on the collected sensor data that has been received and forwarded by the edge server. The edge server receives the threat score from the bot detection service. Based at least in part on the threat score received in response to the query, the edge server then determines whether the request for the endpoint should be forwarded onward for handling, typically by an origin server that hosts the protected endpoint.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
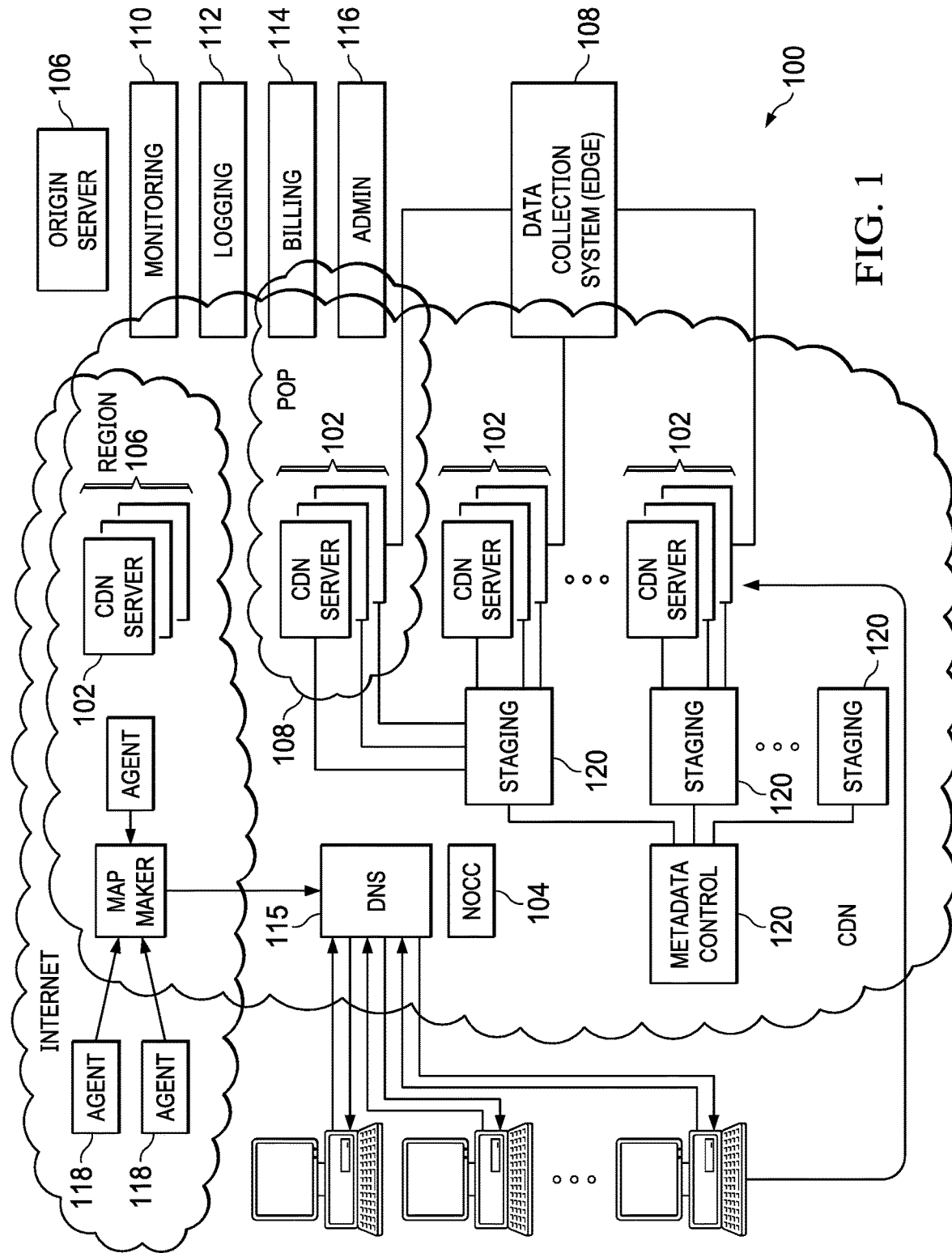
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
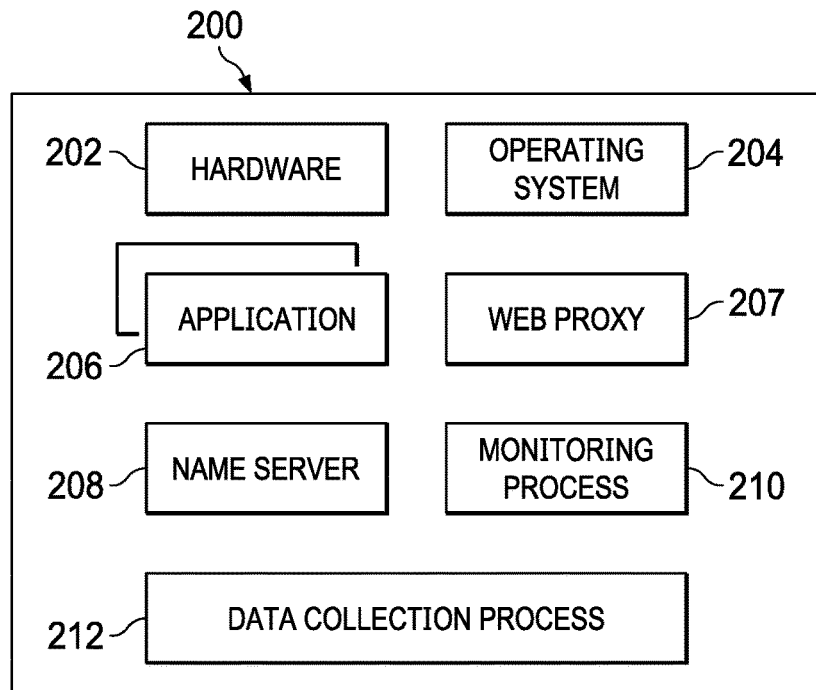
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
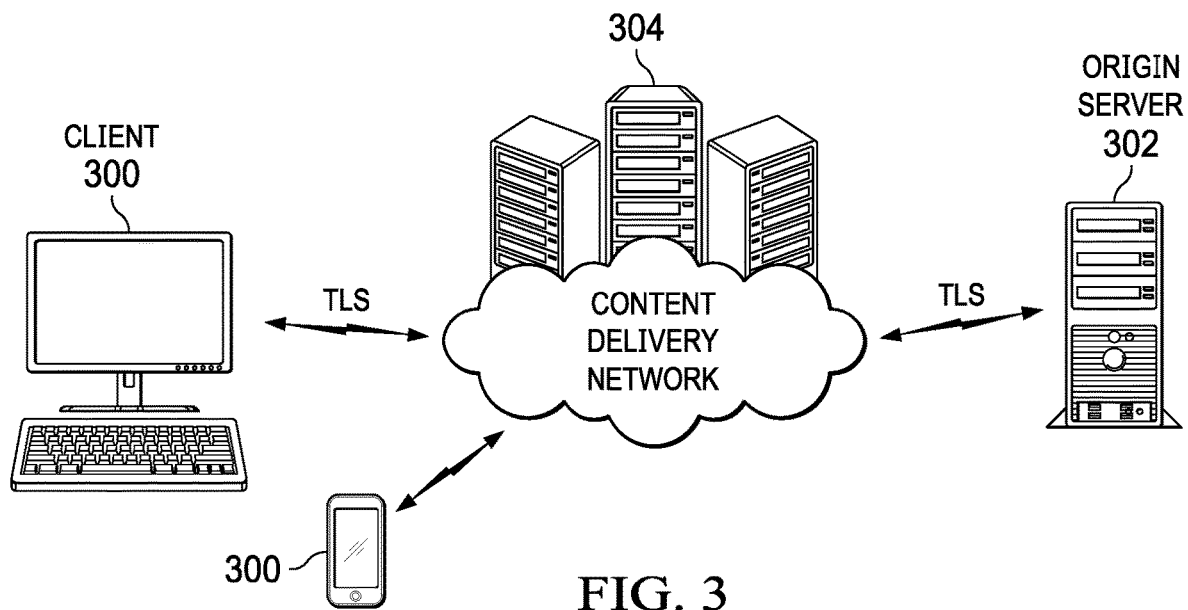
FIG. 3 is a representative active TLS session among a requesting end user client, an edge server, and an origin server.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes a header fingerprint.

It is known to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that "hide" behind a proxy, send request at a low rate, or perhaps have little to no anomalies in their header signatures. To detect these more sophisticated botnets, sometimes running on a headless browser (e.g., CasperJS, PhantomJS, Selenium, NodeJS), more advanced detection techniques may be used. JavaScript injection techniques are widely used in the industry to help detect these more advanced botnets. In particular, a bot that shows little anomalies in the header signature and behaves "like a regular user" may actually not fully support JavaScript. For a bot that fully supports JavaScript, it is desirable to inject code that helps collect specific characteristics (a fingerprint) of the client that when evaluated, helps detect them.

Bot detection using information collected through Javascript (JS) may proceed as follows. At step (1), the JS is dynamically injected at the edge on the relevant pages (text/html). At step (2), the client loads the JS, executes it, and sends the data collected asynchronously. At step (3), the edge server intercepts and evaluates the JS fingerprint, looking for specific anomalies typically seen when coming from an automated system (script or bot, etc.). At step (4), each anomaly is given a score and, if the fingerprint total anomaly score goes beyond a certain threshold, the client is classified as a bot. The result of the fingerprint evaluation is recorded in a session cookie and evaluated with each subsequent request.

Figure 4:
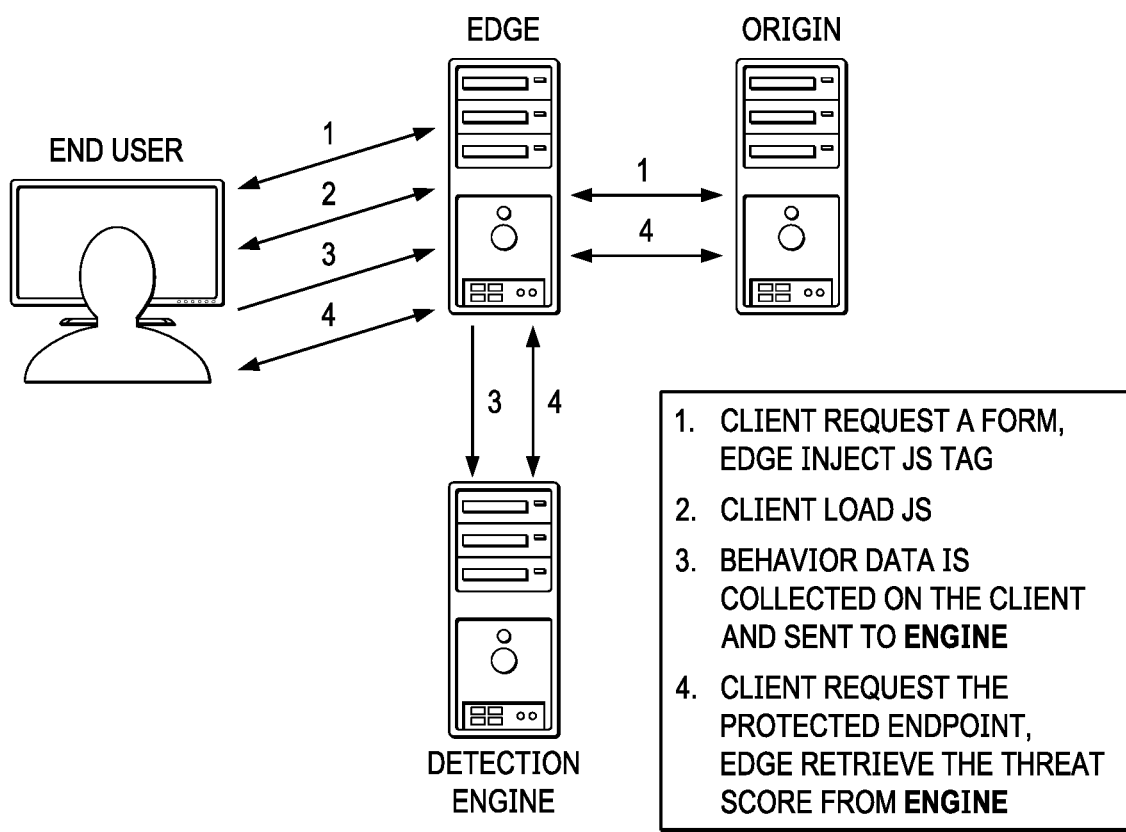
FIG. 4 is a technique by which a script-based technology is used to collect a fingerprint and other behavioral data from a requesting client.

Thus, and as depicted in FIG. 4, JavaScript-based technology collects a lightweight fingerprint and other behavioral data from the client. The data is collected asynchronously and sent to a bot detection engine. On a protected request (e.g. TLS-secured POST login), the edge server obtains the client classification from the bot detection engine and applies it on the edge.

Several methods may be used to detect bots using the fingerprint include, without limitation, anomaly detection, dynamic rate limiting, and blacklisting.

Anomaly detection is based on the principle that good browsers (such as Chrome, Firefox, Safari, and the like) have a few valid combinations of given fingerprints for each browser version. The "known" or "correct" combinations are learned a-priori. This can be done by analyzing prior human traffic and building a table of valid combinations (user agent and associated fingerprint possibilities). A bot script masquerading its user-agent as one of the well-known browsers is then caught by checking for the existence of the user-agent and the given fingerprint in the "known/correct" table.

Dynamic rate limiting is based on the principle that the system keeps tracks of the received fingerprints and then rate limits given fingerprints. Bot Attacks can be blocked in this way, as the given fingerprint will rapidly exceed the allowed rate threshold.

Blacklisting is based on the principle that the fingerprints of malicious bot tools can be collected and stored in a database/file (also known as a blacklist file). When a fingerprint is part of this blacklist file, it is then blocked.

All of the above techniques can be modulated with other signals to produce higher accuracy.

Summarizing, the browser validation process collects information from the client using JavaScript techniques to help identify the type of client machine the edge server is interacting with and the configuration of the browser. This technique is often times referred as "fingerprinting." The process does not collect any information that could identify the user of the machine. The data collected (also known as the fingerprint) preferably is sent to a data collection platform and kept for a given time period. Preferably, the fingerprint is used to enable the provider to research and define new heuristics that help the bot detection engine to detect more advanced bots. These heuristics are preferably instantiated as detection rules and become part of a fingerprint evaluation ruleset. Preferably, the fingerprint process is only executed once a session. By analyzing the fingerprint and combining multiple parameters of the fingerprints together, it is possible to uniquely identify the client and to identify which site protected with the browser validation technology a given client visited. As additional related fingerprint information is collected and analyzed, the fingerprint evaluation ruleset may evolve, allowing the system to detect more bots. Preferably, clients that are identified as bots are tracked through their session cookie. The session cookie is unique to a given web site and cannot be used to correlate the activity of a given bot on other web sites, although the system may provide for the ability to track the activity of a botnet across customers that use the bot detection service. Activity coming from these bots preferably is tracked and reported. Logs of this activity are then to generate bot activity and bot analysis reports that can be reviewed by a customer through a secure portal.

Without intending to be limiting, the following provides additional details about the data collection process. Preferably, the JS injection technique collects client characteristics by querying DOM window objects, and also collects client characteristics by detecting browser automation. To enhance security, preferably the JS code is obfuscated, and there may be several versions of the obfuscated object to make the code appear to be different each time. The version of the JS served is recorded in the cookie to validate that a client follows a predefined workflow. Data collected by the JS is sent to the server as a URL-encoded form POST. The edge server extracts the relevant parameters and evaluates the values in-line to detect the bot. If a bot is detected, the session is flagged, and the full fingerprint is forwarded to other systems for further evaluation, typically off-line. Preferably, the JS executes a challenge that is self-contained in a single object. The code may be minified. Preferably, when injecting the JS, the transformed object is not cached at the edge. Cache busting headers may be sent to the client to prevent the transformed object to be cached by the browser or an intermediate proxy, and to further prevent false positives. The JS challenge object may be cached at the edge for a given time period.

In one operation, a client makes a request for a HTML page on a site protected with the bot detection service. In this example scenario, assume that primary bot detection rules did not trigger but that the client supports cookies. When receiving the request, the edge server validates a bot detection session cookie and fetches the content from the origin if not found in cache. If the user-agent indicates that the client supports JavaScript, the edge server injects the JavaScript code to the HTML page. To this end, a JavaScript is injected at the end of the document header, and the URL referencing the script may a challenge_ID computed in part from a FILE_ID. The edge server randomly selects a number representing the challenge file ID (FILE_ID). Using the FILE_ID and other data, the server computes the challenge_ID. Before serving the response, the edge server preferably updates the bot detection session cookie to indicate the browser validation process was initiated. The client receives the response and updates its cookie store. It parses the HTML code, and requests the different embedded objects (images, CSS, JS fonts). One of these objects will be the JavaScript challenge. Basic bots that are configured to only request specific types of content or do not use JavaScript will not request the embedded objects. When receiving the request for the JS challenge, the edge server validate the bot detection session cookie and fetches the challenge object from a data store when not found in cache. The response from the data store may include a unique identifier (UUID) that helps identify the challenge when receiving the fingerprint, and it helps prevent replay attacks. Before serving the response, the edge server updates the Bot detection session cookie with the UUID. If the client supports JavaScript, it executes the script, collects all relevant parameters (fingerprint). The fingerprint is sent to the edge as a POST request, preferably on a "fingerprint callback" URL. The challenge ID set during the injection phase is reflected in the callback URL.

When receiving the fingerprint, the edge server validates the bot detection session cookie and performs the following: (a) validates the challenge ID, (b) authenticates, the fingerprint by validating the UUID, (c) extracts the relevant parameters for in-line bot detection, (d) evaluates the different parameters against the ruleset, (e) if the fingerprint data was received and passed the validation, the server updates the evaluation state in the session cookie to "Complete" when serving the response, (f) if the fingerprint data was not received, the server updates the evaluation state in the session cookie to "Incomplete" when serving the response, (g) if some anomalies were found in the fingerprint and revealed an automated system, the state is set to "bot" to flag the client so that the appropriate action is taken in the subsequent requests; and (h) once the response has been sent to the client, the edge passes to a learning system the fingerprint, the client ID computed at the edge, the header signature, and all other relevant information deemed useful.

The client updates its cookie store. After a while, the client sends a request for another page view. At this point the client will have gone through the validation process and the session cookie should be present in the request. The edge server validates the cookie, and checks the state of the validation process. If the client has successfully passed the fingerprinting process, it allows the request. If the client has completed the fingerprinting but was flagged as a bot, the edge takes the action associated with a bot detection rule. If the client did not complete the fingerprinting process, the edge server takes the action associated with an evaluation rule.

Preferably, the challenge served has a limited TTL of a few seconds (that is configurable). This timer defines how long the challenge is valid for and how long the client has to complete the validation process. This timer is designed to help reduce the following risks: detect bots that never request the JS or send a fingerprint, and replay attacks on the fingerprint. Preferably, the mechanism includes a retry process to give the client a second chance to complete the validation process and prevent false positive in the following scenarios: when the user navigates away from the page before the fingerprint process completed, the site automatically redirects or reloads a different page, e.g., based on some geolocation, and the JS process is initiated within an iframe.

The following portion of this document describes an architecture and design to integrate the scripting-based technology into a CDN service to protect web applications.

Initially, the following glossary defines the different terms used below to describe different elements of the architecture and the design:

fingerprint: data (a data set) collected by a JavaScript or SDK running on a client; the fingerprint typically comprises one or more characteristics of the machine and web browser, such as the screen size, browser version, font supported, browser plugins installed;

telemetry: data recording user behavior, such as (without limitation) mouse movement, gyroscope data, keystrokes, touch screen interaction;

sensor data: a collection of the fingerprint and the telemetry being sent by the client machine;

bot detection service: a computing infrastructure (machines, devices, appliances, software, database, data, etc.) that evaluates the sensor data;

bot detection service cluster: a set of servers, e.g., running a bot detection engine) and that evaluate the sensor data for a given customer;

bot detection service API: an Application Programming Interface (API) that receives the sensor data and allows an edge server to retrieve a threat score;

threat score: a client classification (bot or human) returned by the bot detection service based on the evaluation of the sensor data;

autopost: a JSON-formatted POST request that is generated by the bot detection service JavaScript on the client side and that carries the sensor data;

user behavior analysis: the process of collecting fingerprint and telemetry from the client to evaluate the behavior of the user to classify it as a human or bot;

credential abuse: a type of web attack that typically comprises replaying a known list of valid credentials (username+password) against various web sites in an attempt to take over the account;

gift card abuse: a type of web attack that consist in guessing the PIN code associated with a gift card through a brute force attack;

scraper reputation: the reputation of an IP address (IP) in a client reputation "scrapper" category;

base page: a main HTML page that hosts the code for the main structure, content of the page and that typically references additional objects such as JavaScript, style sheets, images; and protected resource/endpoint/API: a web resource/URL to be protected.

The integration of a JavaScript-based bot detection service technology into an overlay network (e.g., CDN) ecosystem is now described. The overlay network platform may have its own bot management detection framework. As described above, an overlay platform comprises a set of distributed technologies that are accessible via a customer configuration portal. As described herein, the JavaScript technology is integrated into the overlay network framework, preferably as a new detection method. The user, when interacting with the portal, sees new detection methods available in the bot manager detection configuration application and may be requested to specify an endpoint to be protected. For convenience of explanation only, the focus for this detection method is the transactional use case such as account login, account creation, checkout flow, customer loyalty reward programs and finally flight, room or event ticket search workflow.

The following describes a bot detection workflow and, in particular, wherein the script-based detection fits in a bot management detection framework that executes in the overlay network edge machines. Preferably, any match on a given bot detection method (in the JavaScript) will cause the request to exit the standard bot detection workflow. Bots preferably are categorized based on a bot management detection rule that last triggered. Preferably, the bot detection method(s) run at the client-request stage, however, the JavaScript-based detection method will not necessarily know of the client classification until a particular response stage (as described below). This means that the JavaScript-based detection preferably runs after standard bot detection (if any). To be as efficient as possible, preferably the JavaScript detection process takes in consideration the result of the execution of the standard detection rules and the action applied.

The following defines a representative set of rules to conditionally execute various detection methods on the requests for the protected endpoints:

When the action of a standard bot management framework detection rule has a lesser or equal weight than the one set for the JS-based detection, the JS-based detection is executed.

When the action of a standard bot management framework detection rule has a greater weight than the one set for the JS-based detection, both the JS-based and standard rule detection are executed.

When standard bot management detection framework rule is triggered and its action has a greater weight than the one set for the JS-based detection, the standard rule is executed.

When a standard bot management detection framework rule is triggered and the category is identified by a customer to be whitelisted, the standard rule is executed.

When a standard bot management detection rule is triggered and has its action set to "allow," "ignore," "tarpit" or "deny," the standard rule is executed. The action weight in the context of the JS-based detection may be as follows: monitor (0)—slow (1)—delay (2)—serve alternate (3)—deny (4)—tarpit (5).

The following description differentiates the detection workflow used when validating a request coming from a mobile native app versus a request coming from regular web client. Native app traffic is mostly JSON driven, the client is generally unable to accept cookies other than the one it is programmed to accept, and the client does not support JavaScript. The header signature of requests coming from native apps has different characteristics than a web client, which can be similar to bot traffic. The requests coming from a device running the mobile native app preferably is identified by its header signature and is validated using a workflow more adapted to these types of clients, which will reduce false positives and make the integration easier. Requests coming from web clients (browsers), which generally do support cookies and JavaScript, preferably are validated though a bot management detection workflow.

Figure 5A:
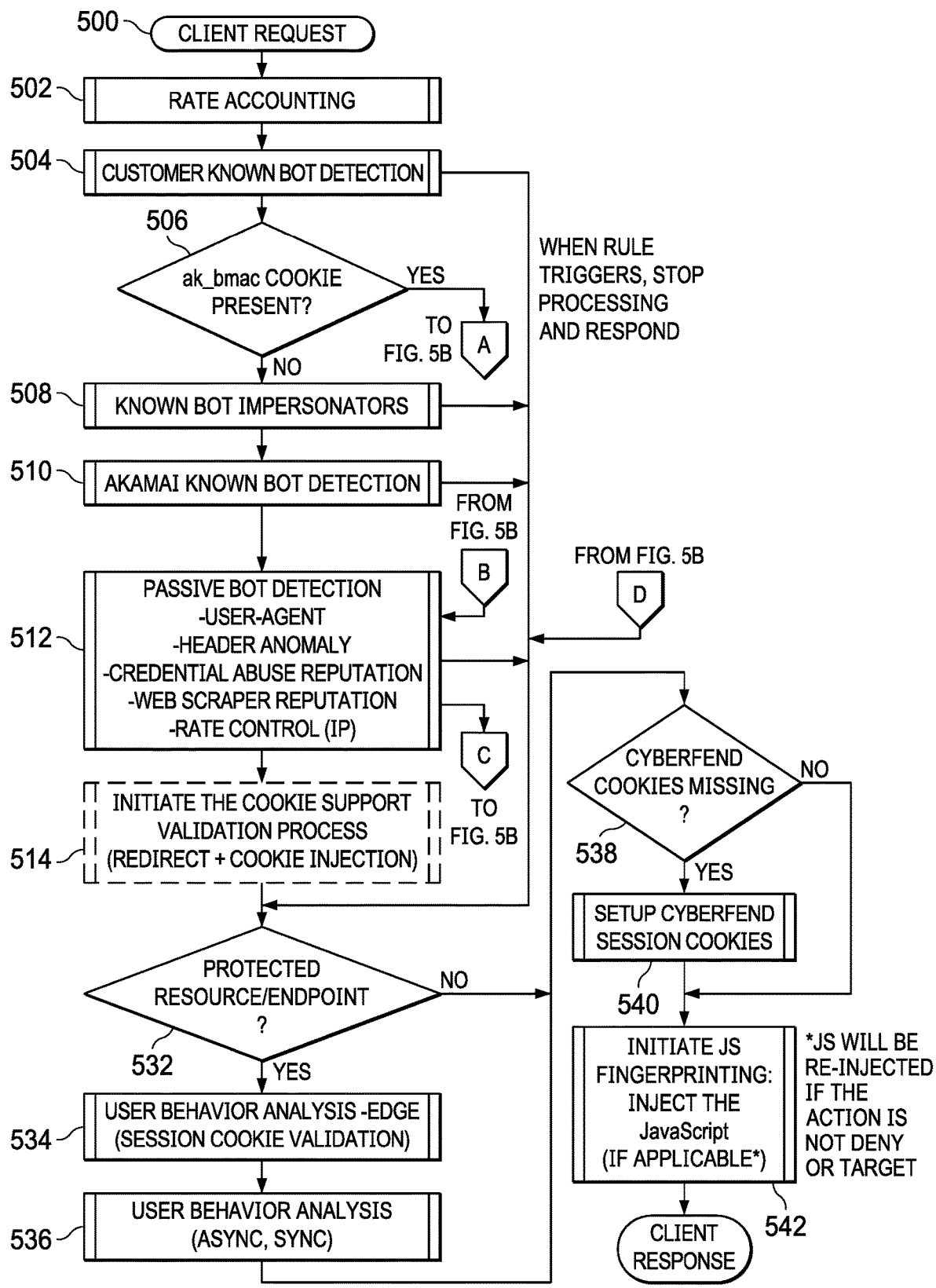
FIG. 5A and 5B depict a representative detection workflow for a web client according to this disclosure.
Figure 5B:
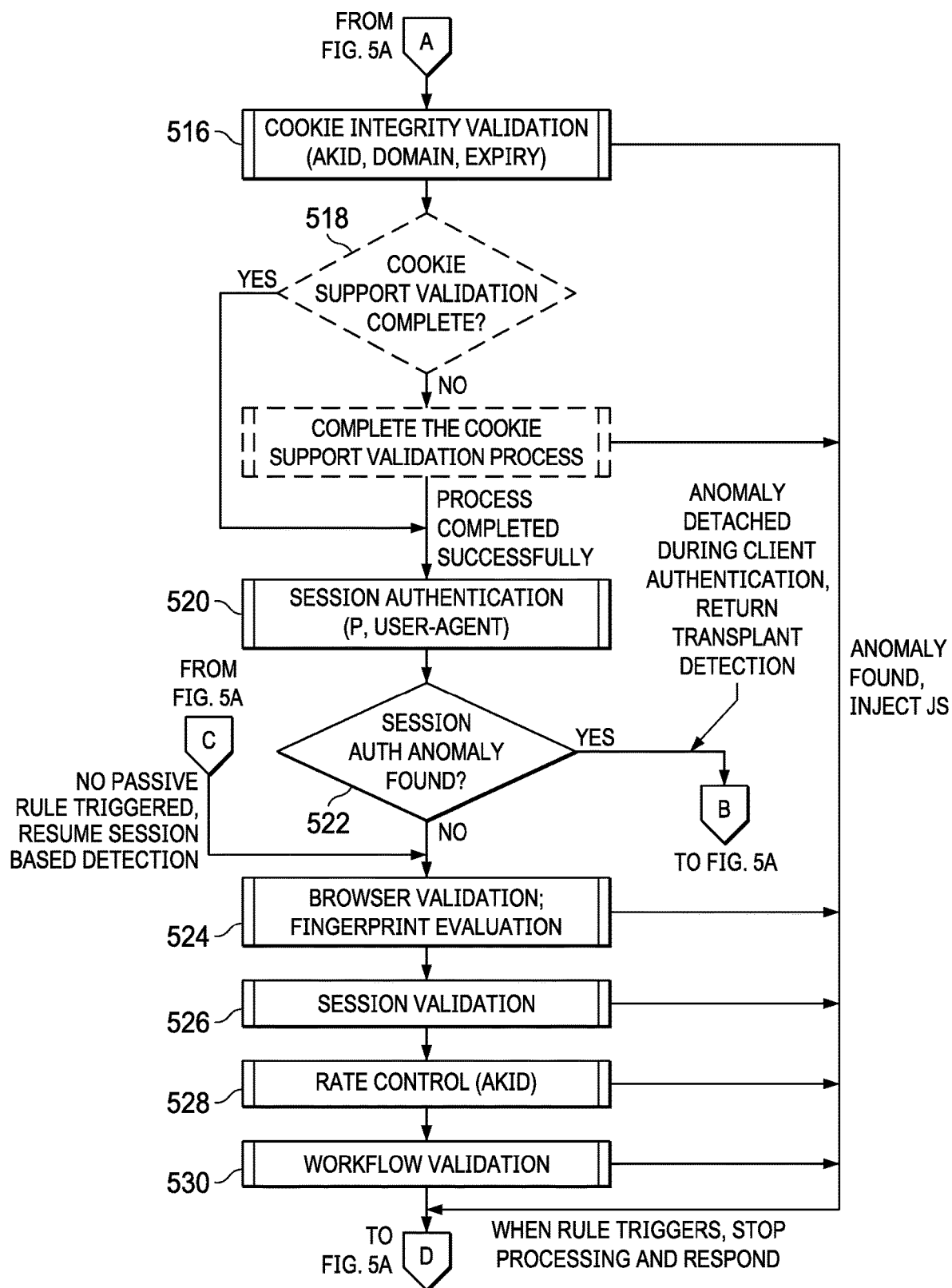

The following describes an implementation of a detection workflow for web clients. FIG. 5A and 5B depict a representative process flow.

In operation, any request that is not identified as coming from a native app is assumed to be coming from a web client. If the request is for a HTML base page (content type text/html), the edge server preferably injects the JavaScript into the page as long as the request is not denied at the edge (e.g., due to rule triggering). This is to ensure that user behavior can be collected on demand. This section presents the detection workflow for the two (2) different options. At step 502, the request 500 made by the client is counted. This request accounting is used to evaluate the client request rate. At step 504, the request is evaluated against customer known bot rules. As depicted, a "standard" bot manager detection workflow is carried out in one of two ways, depending on the outcome of the test 506 that evaluates whether a particular cookie (e.g., ak_bmsc) is present in the request. If the cookie is not present, the routine branches right and processes the request through a passive detection, and wherein if any bot manager rule triggers the bot is categorized based on the rule that triggered and the evaluation then stops. To that end, step 508 checks for known CDN bot impersonators, step 510 checks for known CDN bot detection (against a known bot directory). Step 512 is the passive bot detection, which evaluates user-agent header, request header anomaly evaluation, scraper reputation evaluation, rate control evaluation, and so forth. When cookie support validation is enabled, step 514 initiates a first operation, namely, redirect+cookie injection; if the feature is disabled, however, the process simply sets a cookie. This step is only executed if none of the previous rules are triggered, wherein no session cookie is ever issued to a client identified as a bot. If the outcome of the test 506 indicates that the particular cookie is present in the request, the process branches left. At step 516, the session cookie (AKID, domain, expiry time) is validated. If the cookie is valid and cookie support validation is enabled step 518), the process is complete. At step 520, the user (IP, user-agent) is authenticated. At step 522, a test is done to determine if an anomaly is detected during client authentication; if so, the request is run through the passive detection outlined above. If the outcome of step 522 is negative, the routine at step 524 continues to execute a browser validation process (JavaScript fingerprinting). At step 526, the routine evaluates the total number of base page request (cookie-based page view accounting). At step 528, the session request rate is evaluated. If the request is part of a workflow, step 530 evaluates the request through any workflow validation.

Depending on whether a standard bot management detection rule triggered and the action associated with the rule, a check is performed at step 532 whether the request is defined as a protected endpoint (qualifying for JS-based detection). If the request is for a protected endpoint, the routine checks if one or more additional session cookies (e.g., the bm_sz and _abck cookies, as described below) used for identifying the client within the JS-based technique are present. This is step 534. If one or both of the session cookies are missing, the edge server assumes the client is a bot, and sets the threat score appropriately; if both cookies are present, they are validated (user behavior analysis offloaded at the edge) at step 536. If at least one of the cookies is invalid (or not valid), the edge server assumes the client is a bot, and sets the threat score appropriately. If the cookies are valid (user behavior analysis handled by the JS-based technique), the routine checks to see if the threat score was previously recorded in the cookie bm_sz. If the previous failure to reach the bot detection service was recorded in the cookie (based on its threat score), this is taken into consideration during the evaluation of the threat score returned by the bot detection API (get_threat_score request). If the session cookies are valid, the routine also queries the bot detection API and obtains the threat score corresponding to session identifiers extracted from the cookies. Depending on the threat scores, the client may be characterized as human (no further processing required), humane (fail open), inconclusive, or a bot (triggering the relevant bot manager rule). This operation may also downgrade a previous threat score. If as indicated by test 538 the session cookies are missing in the incoming request, the routine initiates them when responding to the client (step 540). Finally, and if the content type of the object served is text/html, JavaScript fingerprinting is initiated by injecting the above-described script. This is step 542.

The above-described workflow thus leverages two (2) permanent session cookies, a long term one (_abck) valid for a lengthy period to get a historical view of the client behavior, and a short term one (bm_sz) to get a more recent view of the user behavior. The format of both cookies is defined below, and their usage is further explained in the context of the overall workflow described below.

The long term cookie preferably is used in an asynchronous mode only, and it is generated/managed by an overlay network (CD) edge server. It has several purposes: on the client side, it helps control and throttle how much behavioral data (autopost) is sent to the bot detection service. On the bot detection service side, it is used to remember the classification of a user, especially good humans, when the bm_sz cookie is missing from the request and by extension helps reduce false positives. It is also used to detect clients attempting to bypass the bot detection by replaying a known good session cookie.

The long term cookie, which follows, typically consists of several fields that are used for various purposes:

_abck=akid_a~stop_n~HASH~reset_n~misc

The field value akid_a is the Session ID, and this value is used to uniquely identify a user (long term). The bot detection service algorithms use the value to help prevent false positives, and to detect session cookie replay attacks. The field value stop_n signals to the client when to stop sending autopost. It is an integer value and represents the maximum number of autoposts the client is allowed to make before stopping. The field HASH is a hash of various values and is used at the edge to validate the cookie and verify if given values have been tampered with. Preferably, the long term session cookie includes a TTL that is reset each time the cookie is updated. Typically, the cookie is renewed at the same time the short term cookie (described below) is initialized.

The short term cookie (called bm_sz) is used to identify the user session. The behavioral data is recorded in the bot detection service under the bm_sz session ID, and it is referenced when getting the threat score on protected endpoints. This cookie is used in the synchronous and asynchronous modes. The cookie consists of two (2) main fields, one in clear text with the session ID and one encrypted that contains additional subfields:

bm_sz=akid_z~ENC(_a=akid_z;_e=Expiry_time;_d=domain;t=threat_score)

The akid_z field is a random and unique long value generated by an edge server when the cookie is set, and that identifies the client session. The _a is the clear text akid_z value. The _e is the cookie expiration time, and the _d is the domain for which the cookie is set. The t field holds the threat score returned by the bot detection service.

Bot Detection Service API

Preferably, the bot detection service (sometimes referred to herein as Cyberfend Botfender™) has an engine where the behavioral data collected on the client side (through the Javascript or the SDK) is stored and evaluated to determine the type of client (human or bot). The interaction with the bot detection service infrastructure is facilitated by an API, which is now described. Preferably, there are two (2) main types of API calls, namely, autopost, and get_threat_score. The autopost API call is used to pass the data collected by the client to the bot detection service. The get_threat_score API call is used to retrieve the threat score corresponding to the session ID. Preferably, the format of the API call varies depending on mode of operation (asynchronous vs. synchronous), and whether it is desired to pass the data collected to the bot detection service or retrieve the threat score for a session ID. This section describes the different parameters send as part of the API call and their purpose.

In particular, an account_ID typically refers to a CDN customer account ID, and it is used in the engine to differentiate the traffic from different CDN customers. The value typically comes from a variable defined within a customer security configuration. The parameter session_id uniquely identified the client session (short term), and it is value extracted from the bot management detection framework session cookie (bm_sz) and corresponds to the akid_z field. The parameter abck_cookie is used to signal to the client when to stop sending autopost requests or when to reset data collection, and it is extracted from the session cookie (_abck) and corresponds to the akid_a field. The parameter referer is used to pass a request referer value, and it is extracted from the Referer header when present in the request. The parameter user_agent is used to pass a request user-agent value, and it is extract from the User-Agent header when present in the request. The request_headers parameter is used to pass sanitized header order (headers that are not specific to an HTTP method, request type or device), and the value is extracted from a BotnetID process. The parameter page_url is a label given to a protected endpoint and typically is used for reporting; it may be a URL path or another specific label that describes the endpoint. The parameter ip is the client IP address (the IP address connecting to the CDN edge server, and the value comes from an edge server variable. The parameter username_hash is used to protect a login workflow and holds a HMAC hash value of the username extracted from the POST request; otherwise it reflects the session_id. The parameter sensor_data holds the fingerprint and telemetry extracted from the incoming autopost request. The value is empty when request_type is "get_threat_score." The sensor_data value is extracted from the sensor data POST parameter in the incoming POST request. The request_type parameter indicates the type of API request. In particular: get_threat_score retrieves the threat score corresponding to a session ID on a protected endpoint (asynchronous mode), get_threat_score_sync retrieves the threat score (synchronous mode), and autopost passes the sensor data (fingerprint and telemetry) collected on the client side. The parameter iprep is an IP web scraper reputation score. The parameter bmharule is a list of bot management detection header anomalies rule ID that triggered on the request. This enables a data collection accuracy evaluation. The parameter bmhascore is a bot management detection header anomaly score used for data collection accuracy evaluation.

An API URL is used to request content, and it include variable names corresponding to the above-described parameters. The bot detection service authenticates an API call, preferably using basic authorization. An API response is provided to an API call. The bot detection service API typically sends its feedback in the response body, but to reduce the processing cost at the edge, the information preferably is also sent in a header (called the X_BF header). That header preferably includes several field, namely is representing a threat score, ai representing an attempt ID, sp, a stop protocol flag used for autopost, and rp, a reset protocol variable used for get_threat_score. Preferably, this header is not forwarded to the client but is only visible to the edge server.

Detection Workflow

The following section describes a preferred detection workflow.

Figure 6:
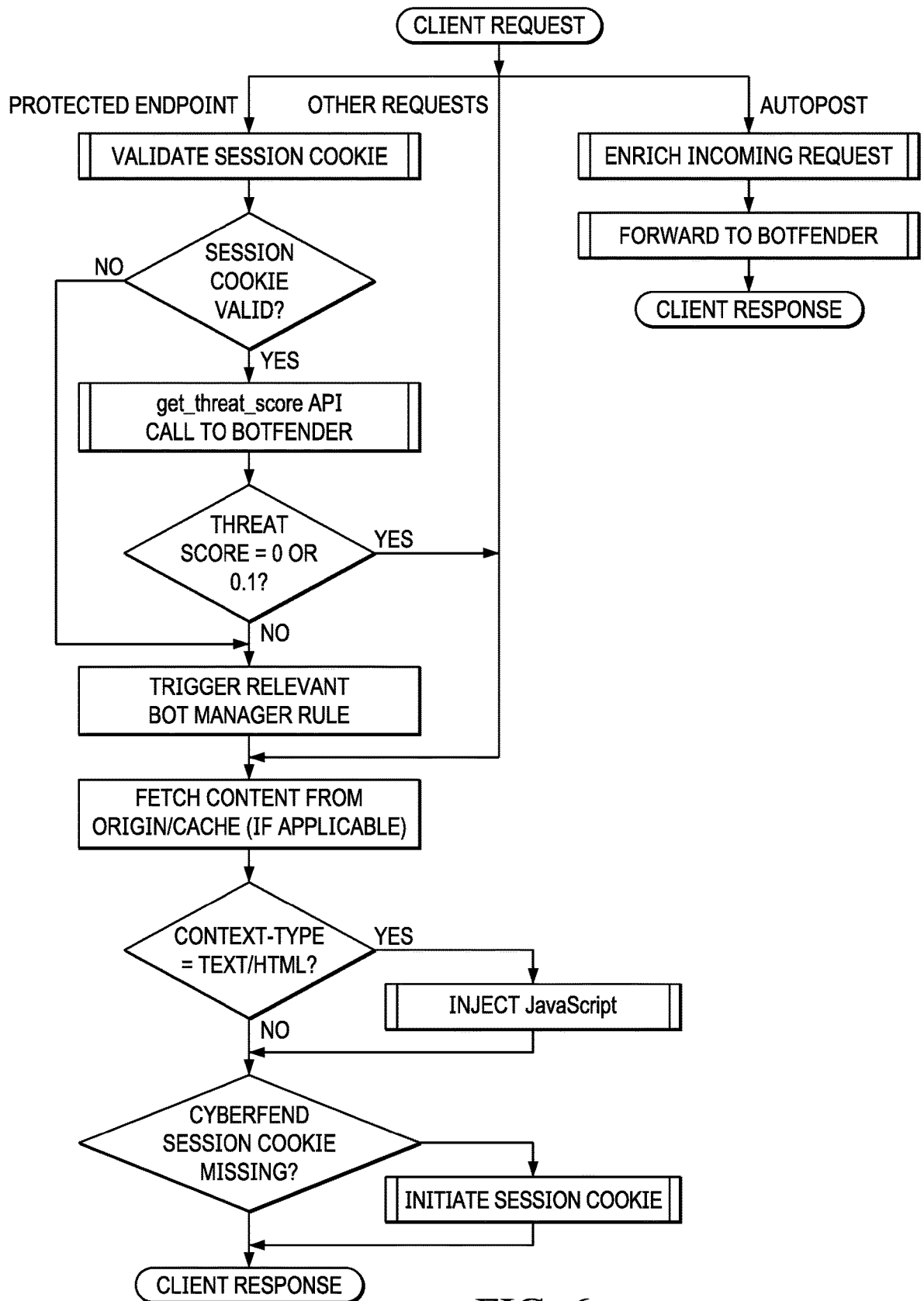
FIG. 6 depicts a representative detection workflow for an asynchronous mode of operation that provides a technique to integrate script-based detection technology into a CDN customer environment according to this disclosure.

This first section describes an "asynchronous" mode that provides a low touch way to integrate the JS-based detection technology into any customer environment. As used herein, asynchronous refers to the way the behavioral data and the fingerprint is passed to the bot detection service. In this mode, preferably the JavaScript that collects the sensor data is injected by the edge server on all HTML pages. Once loaded, the script records the user interaction with his or her mouse, touch screen, keyboard, etc. Preferably, the data collected is then sent on a regular basis to the bot detection service servers. When the user sends a request for a protected resource, the edge server calls the bot detection service API to retrieve the threat score. At a high level, and as depicted in FIG. 6, the workflow works as follows. The JavaScript is injected on all HTML pages that support the endpoint to be protected. Once loaded by the client, behavioral data is collected and sent to the bot detection service infrastructure asynchronously (e.g., via autopost requests).

The autopost request proceeds as follows. The edge server preferably enriches the request with additional information (IP, session ID, header names, user-agent, referer, etc. . . . ) and passes it to the bot detection service. For protected endpoints, the edge server extracts the short and long term client session IDs (cookies bm_sz, _abck) and validates them. If the session cookies are valid, the edge server preferably extracts additional parameters from the request and queries the bot detection service API to retrieve the threat score. If the threat score is different from 0 or a given value, a relevant bot manager rule triggers, otherwise the client is deemed to be controlled by a human. If the content-type of the response is text/html, the javascript is injected. If the session cookie is not valid, the edge server classifies the client as a bot, triggers the relevant bot manager rule and executes the associated action. Other requests (not an autopost or request for a protected endpoint) are processed as follows. If the content-type of the response is text/html, the JavaScript is injected. If one or both session cookies is missing, initiate it.

The following is a representative integration process. The asynchronous mode requires very little effort from a customer. For example, a customer web development and account team identifies the different workflows to protect, specifically the endpoints corresponding to the requests that are regularly abused. The entry point is the page/URL that leads to the request to the protected endpoint. The URL for both the entry and end endpoints may be the same but the methods may be different (GET vs. POST). Once done, the customer or the account team updates a portal configuration and creates a new protected endpoint. To that end, preferably the following information is defined. In particular, the criteria that defines the API/endpoint (hostname, URL path, query string name/value pairs, POST argument name/value pairs, format of the POST body) is defined. The mode is set (for asynchronous), and set the action for the API. The customer optionally defines the entry point, and it is recommended to at least specify the hostname where the JavaScript should be injected to avoid unnecessary data collection in the case where the policy supports multiple hostnames. With the asynchronous mode, preferably a generic JavaScript is injected to each qualifying HTML base pages that has a <body> tag. The JavaScript once loaded collects the machine characteristics (fingerprint), records user behavior such as mouse movement, keystroke and other events (telemetry), and sends the data asynchronously (autopost) to the bot detection service through the CDN platform and while the user interacts with a form (or other rendered content). Preferably, the script and the callback that carry the fingerprint and telemetry are made on the same hostname as the page it protects.

When the user sends a request for one of the protected endpoints, the edge server intercepts it and before forwarding it to the customer's origin, queries the bot detection service (API) synchronously to get the threat score associated with the session. The bot detection service engine returns the threat score associated with the session based on the fingerprint and telemetry collected.

Figure 7A:
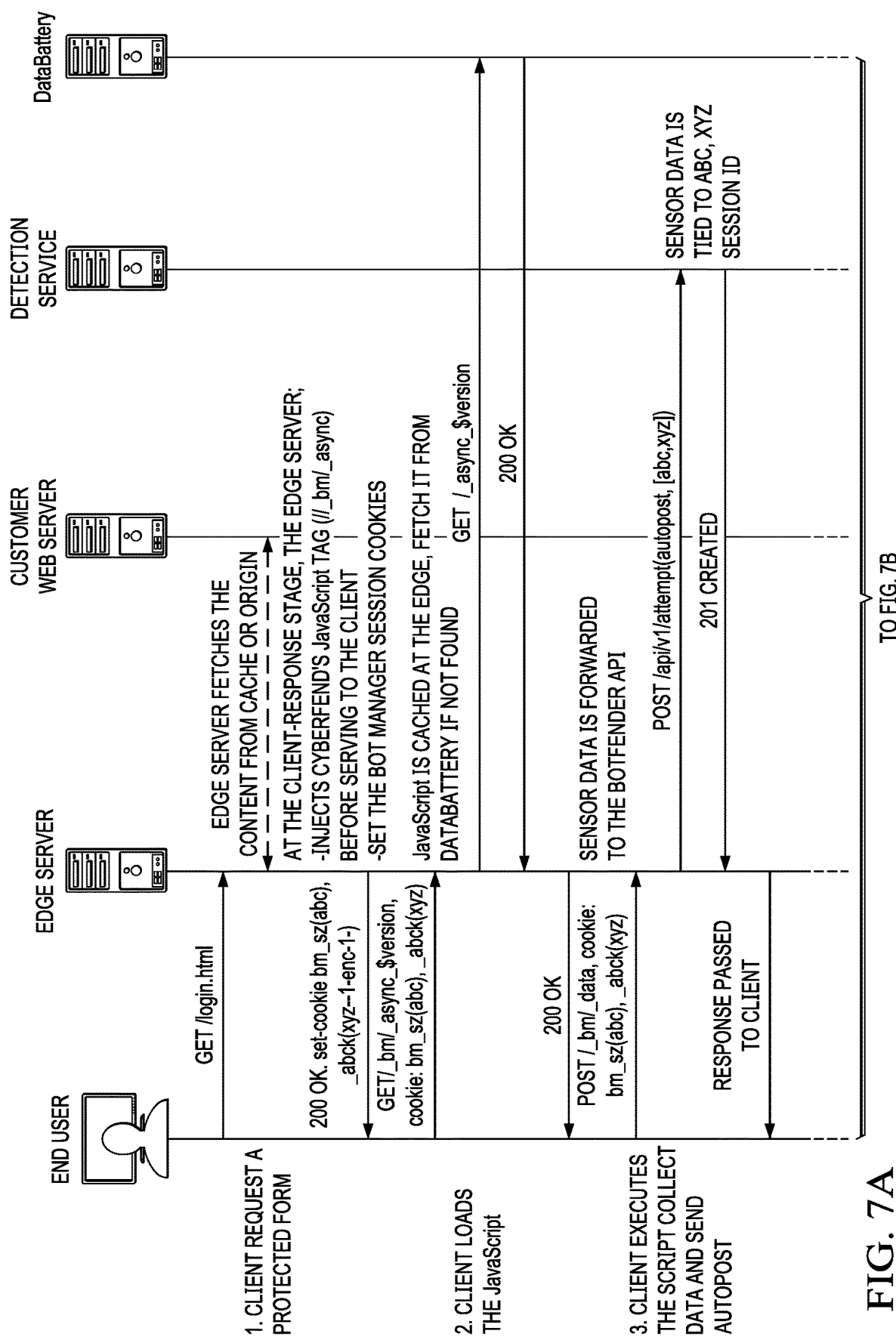
FIG. 7A and 7B depicts a representative workflow of a client/request exchange when a user logs into a protected website.
Figure 7B:
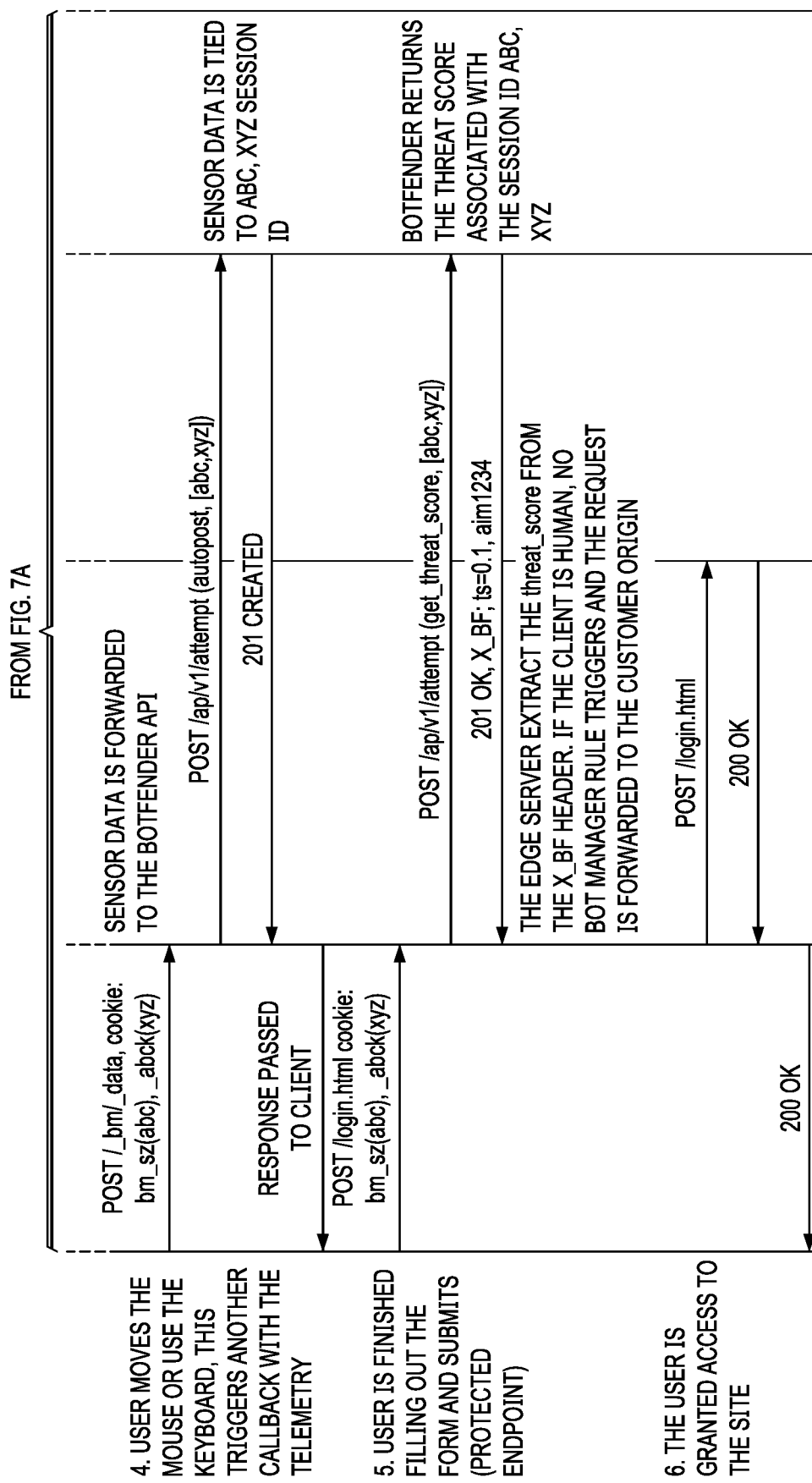

The workflow is illustrated in the client/request exchange flow diagram in FIG. 7A and 7B, which illustrates the process with a user logging in to a web site, and it assumes a brand new user without any session cookie (bm_sz or _abck). At a first step, and when a user starts a new session with a site protected with the bot detection service technology, the edge server sets two session cookies: bm_sz that identifies the current user session, and _abck that is used to control the sensor data flow coming from the client. If the client requests a HTML page, the edge server fetches the content from cache or the origin and before sending the response to the client injects the Javascript on the primary domain. At a second step, the client parses the HTML page and makes a request to load the JavaScript. Then, the client executes the script, the script collects the fingerprint and telemetry and sends it as a POST request to the bot detection service engine through the CDN platform. The bot detection service records the activity under the user bm_sz and _abck sessionID. As the user interacts with the form (keystrokes, touch screen, moves the mouse, etc.), more telemetry is collected and sent; the edge server passes the data to the bot detection service engine until enough data has been collected to determine that the client is human (see below for more details on a stop protocol). The autopost request preferably is triggered on specific javaScript events, such as: mouse click, tab key stroke, enter key stroke, etc. When the user is done filling out the form and submits it (request the protected resource), the edge server intercepts the request and calls the API to get the threat score corresponding to the user sessionID (bm_sz and _abck). In particular, the bot detection service will first lookup the threat score based on the bm_sz session ID (short term ID lookup) and confirm the score based on the _abck session ID (long term ID lookup). This short and long term lookup helps better handle false positive scenarios in the case the bm_sz cookies has expired mid-session and not enough evidence has been collected under the new session ID (see below for details on a process to revive a session cookie); it also helps detect attempts from bots to replay a good session cookie to evade detection. The bot detection service returns the threat score in the X_BF header (ts field). The CDN edge server extracts the threat score (ts), attempt id (ai), reset protocol value (rp) from the X_BF header, and evaluates the values. If is is less than or equal a defined value, the client is human, and the request is forwarded to the customer origin web server. If ts is greater than or equal a defined value, the client is a bot, and the corresponding bot manager rule is triggered and the associated action excited. The details regarding evaluation of the rp field is described below. In the event the threat score indicates the client is a bot, this triggers the relevant bot management framework detection rule and the associated action is executed.

Reviving Idle Sessions

The following describes a workflow for reviving idle sessions (bm_sz expired) on autopost requests.

The bm_sz session cookie is currently set with a relative short (hour-based) TTL. A user may not complete his activity on the site before the session expires, however. Thus, according to another aspect, the framework includes a mechanism to reset/revive the bm_sz session cookie as necessary. For example, a user may decide he or she wants to book a vacation and visit his favorite airline's web site that is protected with the techniques herein. When the user requested the main page that has the flight search app, the JS is injected and starts collecting and sending data to the service, as has been described. As soon as the page loads, the user starts entering the destination, select the dates but then gets distracted (phone call, meeting, kids) but does not close his or her browser. It may take a few hours for the user to resume his or her activity on the site, at which point the cookie may have expired. When the user restarts interacting with the site, this will trigger additional callbacks to feed data to the bot detection service; to address this scenario, and in particular to prevent false positives when the user finally submits his flight search request (the protected resource), the session cookie preferably is reset when receiving the first autopost without session cookie.

Figure 8A:
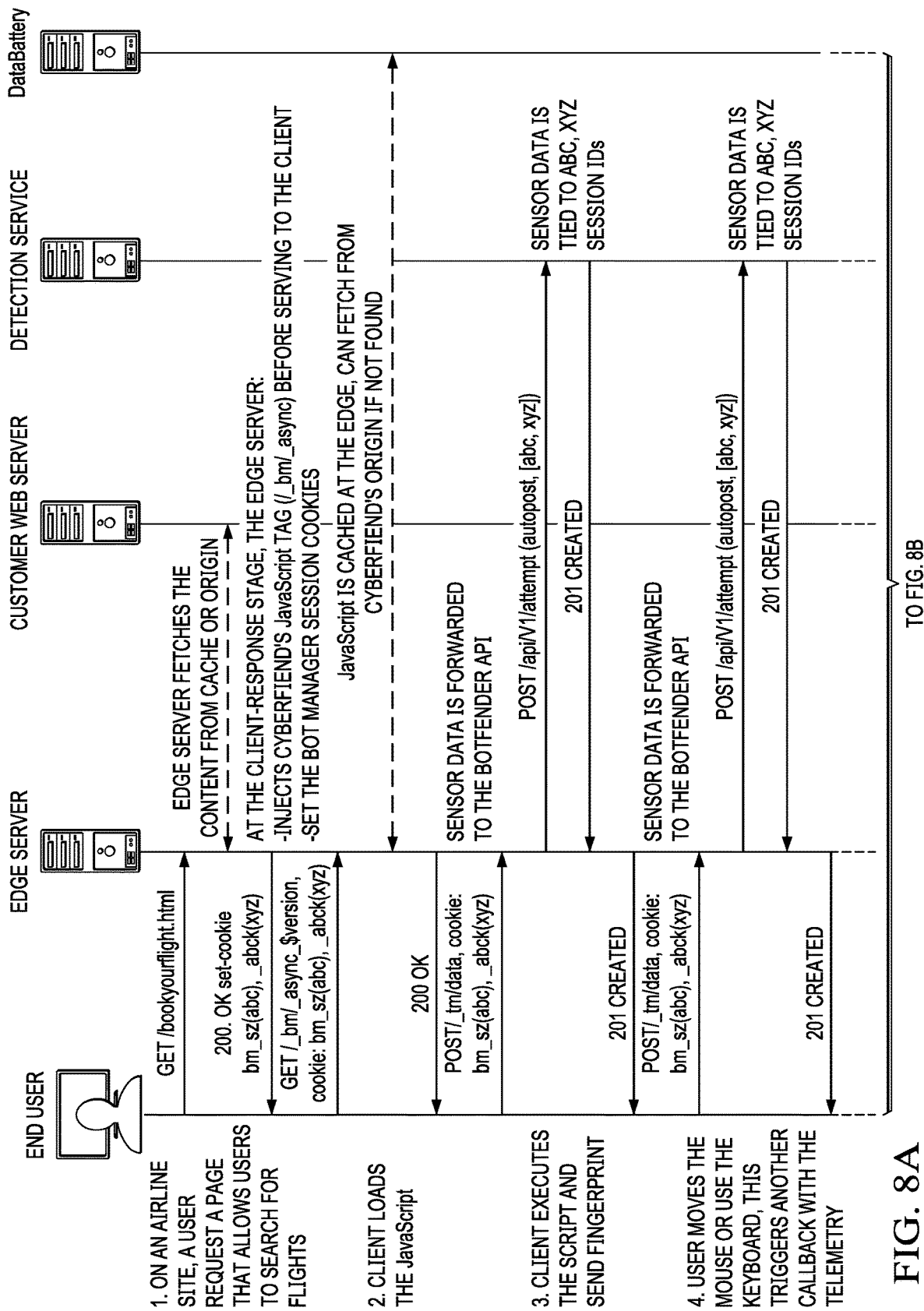
FIG. 8A and 8B depicts a representative workflow by which an idle session is revived on an autopost request.
Figure 8B:
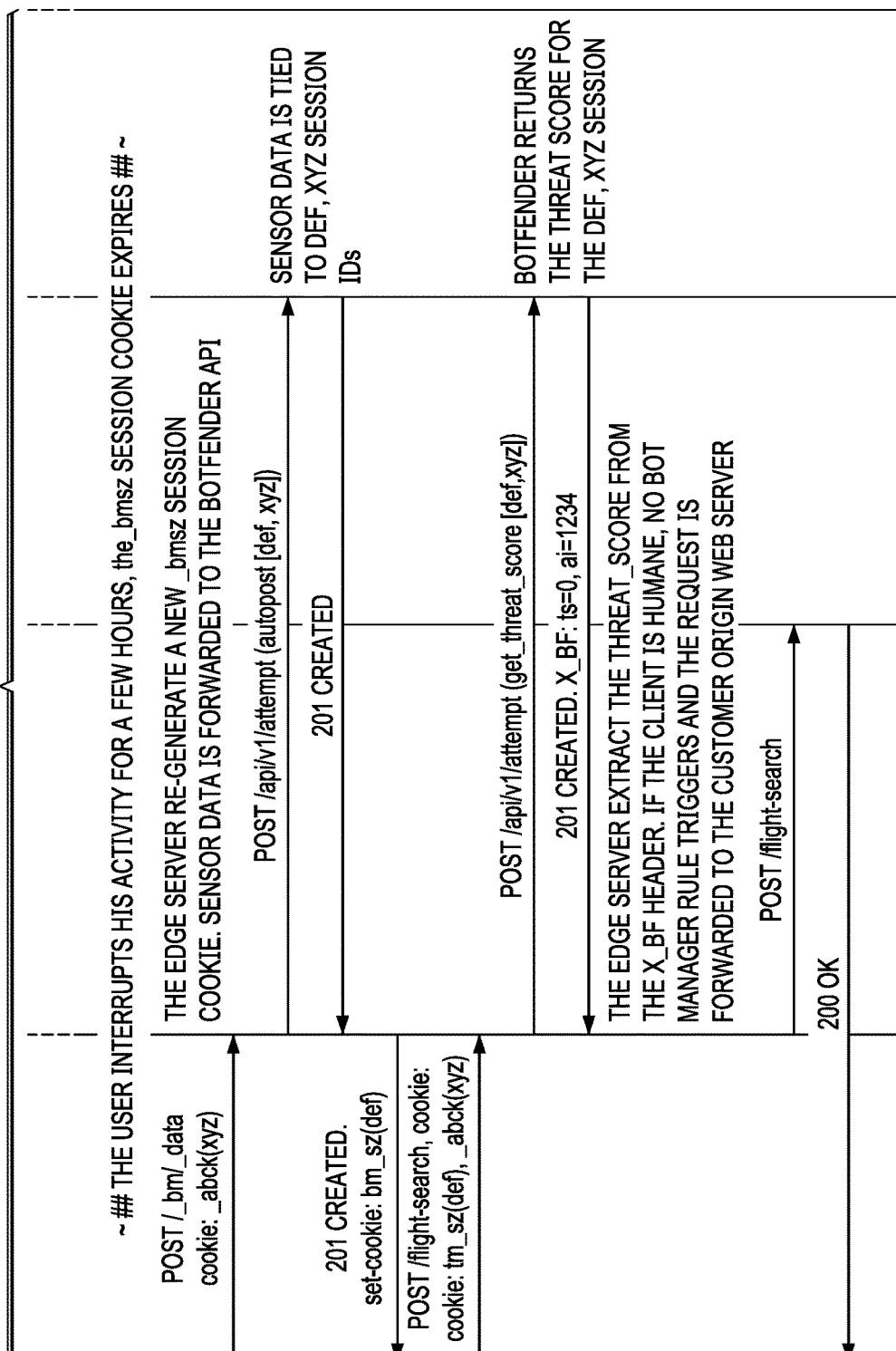

FIG. 8A and 8B illustrate the exchange workflow in this scenario. It begins when the user visits a page, e.g., the flight search page. The edge server fetches the requested content and sets the bm_sz(abc) and _abck(xyz) session cookies and injects the JavaScript in the page before responding to the client. The client loads the JavaScript. The client then executes the JavaScript to start collecting the behavior information. As described, the sensor data is sent to the bot detection service and recorded under the user session ID (abc, xyz). More autoposts are sent as the user interacts with the page. The sensor data is sent to the service and recorded under the user session ID (abc, xyz); however, in this example, the user gets distracted and interrupts his or her interaction with the site for several hours. Then, the user eventually resumes his or her interaction with the site, but by this time the bm_sz cookie has expired, although the _abck cookie is still present. More autoposts are triggered based on the follow-on user interaction. When receiving the request, the edge server notices that bm_sz cookie is missing and generates a new one (def). The sensor data is sent to the bot detection service and recorded under the user session ID (def, xyz). After having entered the destination and travel dates, the user clicks submit to see the available flights; the edge server intercepts the request and queries the bot detection API to get the threat score corresponding to the session ID (def, xyz), and a threat score is returned to complete the process.

Stop Protocol

The following describes a stop protocol (autopost requests). In particular, FIG. 9A and 9B depict depicts the workflow among the client, the edge server, and the bot detection service with respect to the Stop protocol.

In operation, and after receiving a few autopost requests, the bot detection service may find enough evidence in the sensor data received to categorize the client as human. A Stop protocol as is now described is designed to send a signal to the client to indicate when to stop sending autopost requests. It is advantageous, as it significantly reduces the number of requests the edge server needs to handle, and the amount of data the bot detection service needs to process. When the bot detection service has received enough data to conclude the client is human and wants the clients to stop sending autopost, preferably it will send the "sp=N" field in the X_BF header when responding to the edge server, where N is an integer 0, 1, 2, 3, etc. The value N indicates to the client the total number of autopost it is expected to send per page before stopping. In one embodiment N is equal to "0", indicating to the client to stop sending any autopost data until further notice (see also the reset protocol that follows).

The following describes the behavior of the edge and the client depending on the sp value. Thus, e.g., if sp=1, this indicates to the client to send just one autopost per page. In such case, the edge server extracts the sp value from X_BF header, removes the header, updates the _abck session cookie, and sends the response to the client; meanwhile, the client extracts the sp value from the _abck session cookie, keeps track of the number autoposts sent (X). Before sending an autopost, the client compares the local autopost counter (X) with the stop threshold in the _abck cookie. Depending on the outcome of the comparison, the client either sends the autopost, or not. When sp=0, this indicates to the client to stop sending the autopost. The edge server extracts this value, removes the header, updates the session cookie and sends the response to the client; the client extracts the value from the sending cookie and responds by ceasing the sending of autopost (s).

Figure 9A:
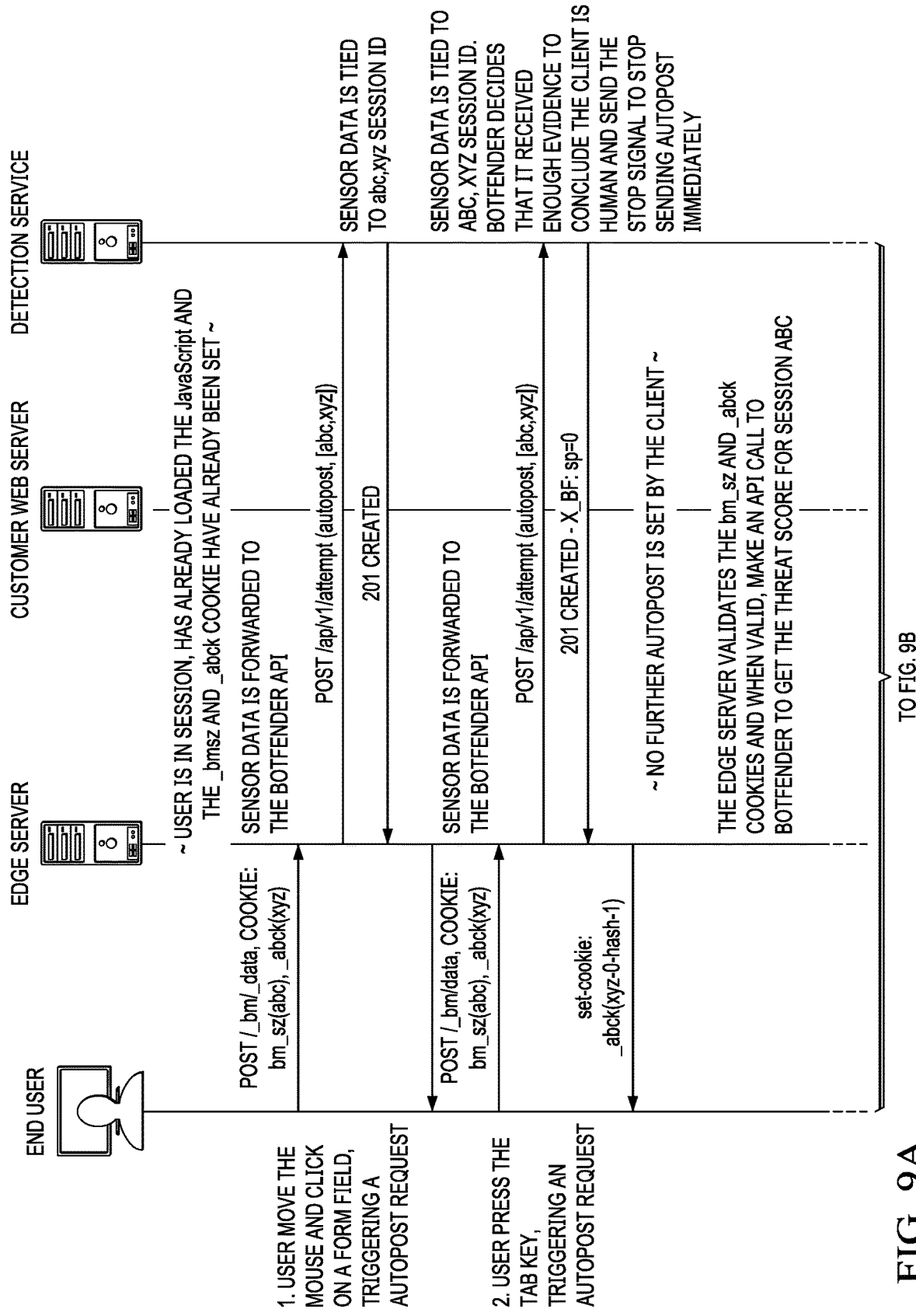
FIG. 9A and 9B depicts a representative workflow among a client, an edge server, and the bot detection service of this disclosure with respect to stop protocol.
Figure 9B:
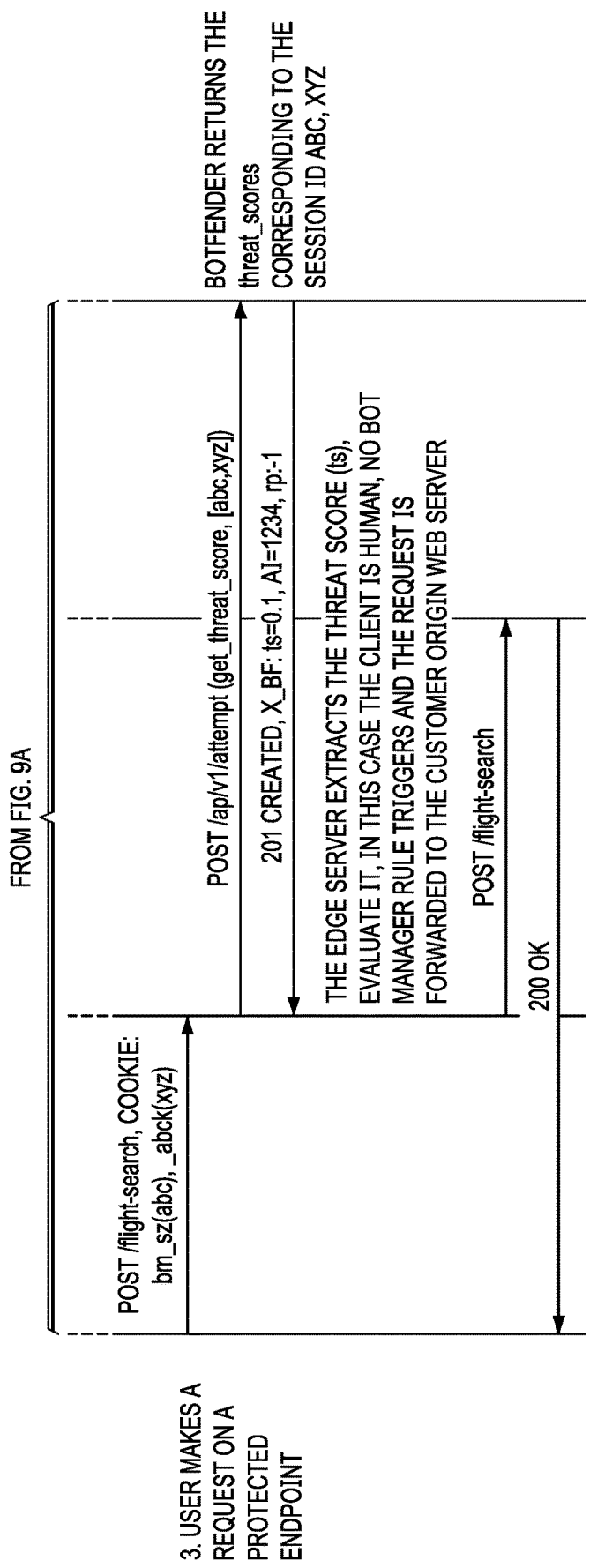

FIG. 9A and 9B depict the workflow among the client, the edge server, and the bot detection service with respect to the Stop protocol.

Reset Protocol

Figure 10A:
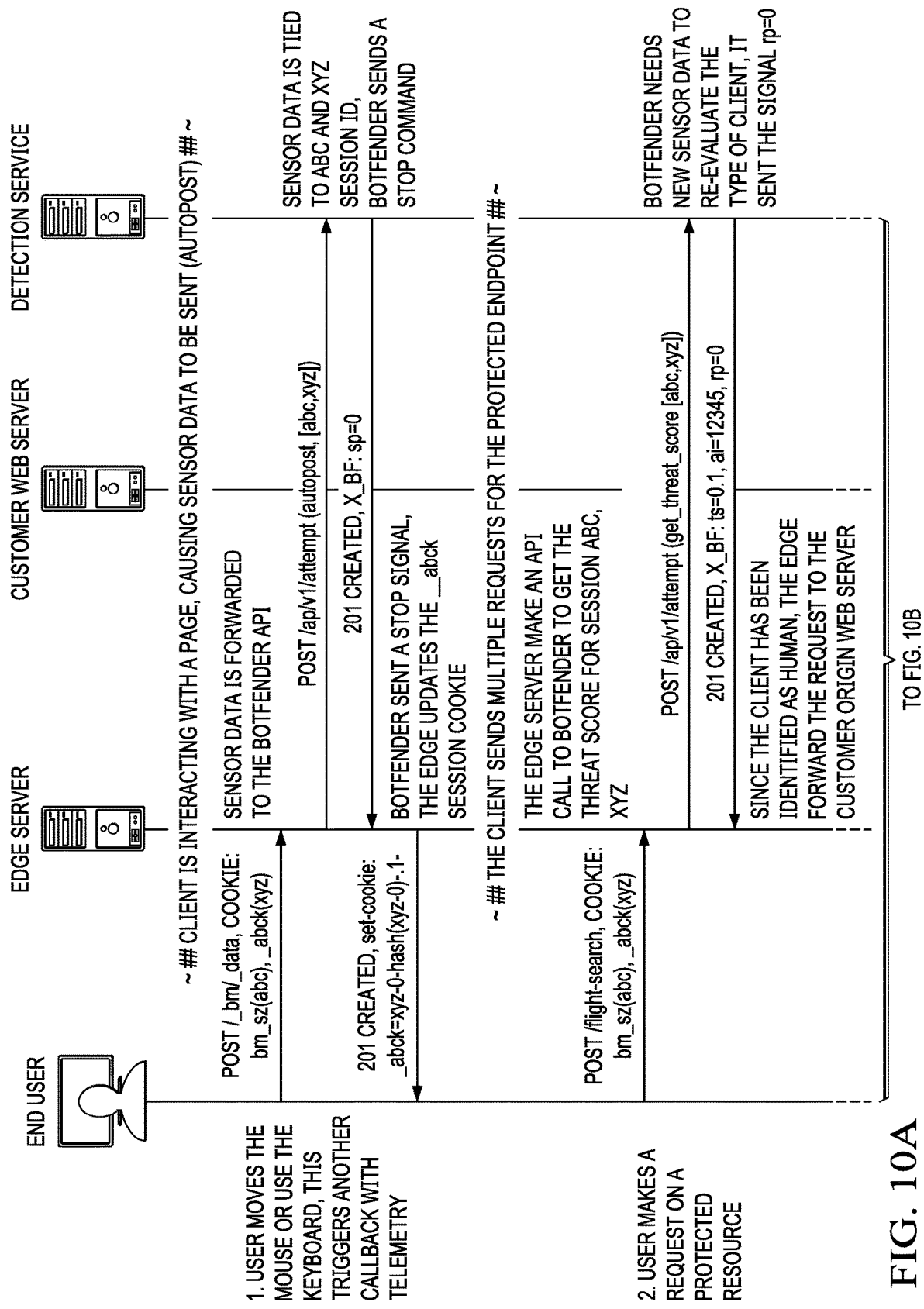
FIG. 10A and 10B depicts a representative workflow of a reset protocol according to this disclosure.
Figure 10B:
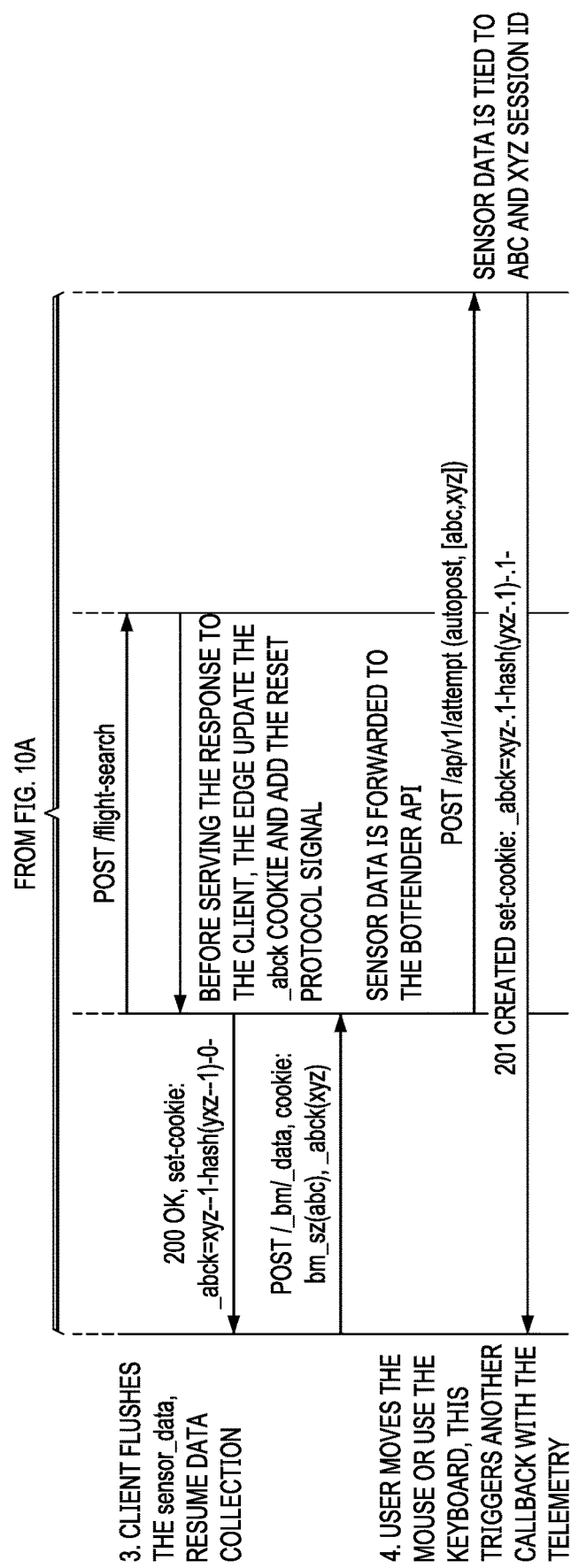

The following describes a Reset protocol (with respect to get_threat_score requests). This protocol is depicted in FIG. 10A and 10B. As described, requests to protected endpoints trigger a get_threat_score to the bot detection API to retrieve the threat score associated with a sessionID. The request pattern to the protected endpoint made from a given session at some point may fall into a "bot pattern." If a stop flag (as described with respect to the Stop protocol above) was set previously, it is necessary to reset the behavioral data collection to re-evaluate a client to answer a subsequent question: "Is a client that was previously classified as a human really a human"? According to this aspect, this operation is evaluated through a reset protocol that is now detailed.

In particular, preferably the response from the bot detection service to a get_threat_score request has an additional "rp" field in the X_BF header along with the threat score (ts) and attempt ID (ai). The possible value of the "rp" field and its meaning are as follows. If the value is 0, the data collection on the client side is reset while preserving the _abck cookie session ID (akid_a). In such case, the edge server behavior is update the _abck cookie by resetting the sp field to resume autopost and set the rp field to 0. The client behavior is to clear data collected so far, resume behavioral data collection and send autopost on specific events (click, key press, touch, etc.). When the rp field value is "1," the data collection is reset and a new _abck cookie session ID (akid_a) is generated. The edge server behavior in such case is to create a brand new session cookie session ID (akid_a). The client behavior is the same as described.

FIG. 10A and 10B depict a scenario that assumes the client has already loaded the JavaScript, has valid bm_sz and _abck session cookies, and has already sent a few autopost requests. As depicted, and as the user interacts with the site, more autopost requests are being sent and forwarded to the bot detection service. If the service considers that it has already collected enough behavioral data, it sends a stop signal in the response as previously described. The edge server updates the _abck session cookie. Upon receipt of the new session cookie, the client stops sending autoposts. Then, the user makes a request for a protected endpoint. This triggers a get_threat_score request to the bot detection service to retrieve the threat score corresponding to the bm_sz and _abck session cookies. The get_threat_score triggers an algorithm in the bot detection service that causes it to add the reset protocol value (rp) in the response (X_BF header). The edge server extracts the threat score (ts), attempt ID (ai) and reset protocol value (rp) from the X_BF header. Because in this case the client is classified as a human, the request is forwarded to the customer origin web server. Before serving the origin web server response to the client and because the value in this example is "0," the edge server updates the _abck session cookie as follows: it updates the reset protocol field (rp) to the value received from the bot detection service (0), updates the stop protocol field (sp) to −1, and updates the hash value. Upon receipt of the new cookie value, the client clears the data collected so far, restarts the behavior data collection, and restarts sending autopost request(s) based on specific events. The new data is forwarded to the bot detection service and recorded under bm_sz and _abck session cookie IDs. To complete the "reset" process, the edge server reinitializes the "reset" flag back to "−1" when forwarding the response to the first autopost request to the client. This completes the process.

Recovering from Failed Autopost

The following describes a workflow to recover from a failed autopost. In particular, and to prevent delays in request processing and avoid having the edge server hold on to autopost requests too long before responding to the client, the edge server preferably only waits a predetermined time to establish the TCP connection and another given time period to get a response before dropping the request. In this case, the edge server records a failure into the bm_sz session cookie and sets the threat score to −1 when sending the response. This also means it is possible for a request for a protected resource to reach the edge server before the autopost data has been successfully passed to the bot detection service, and it could cause a false positive. To mitigate the effect of this race condition, if on the protected resource the detection service replies with a score of "1" or "0.xx." the edge server preferably takes in consideration the fact that the previous autopost request failed to reach its destination and will automatically downgrade the score so that the client is not wrongfully classified as a bot (false positive). The score of −1 is cleared from the session cookie as soon the edge succeeds to communicate with the bot detection service.

Figure 11A:
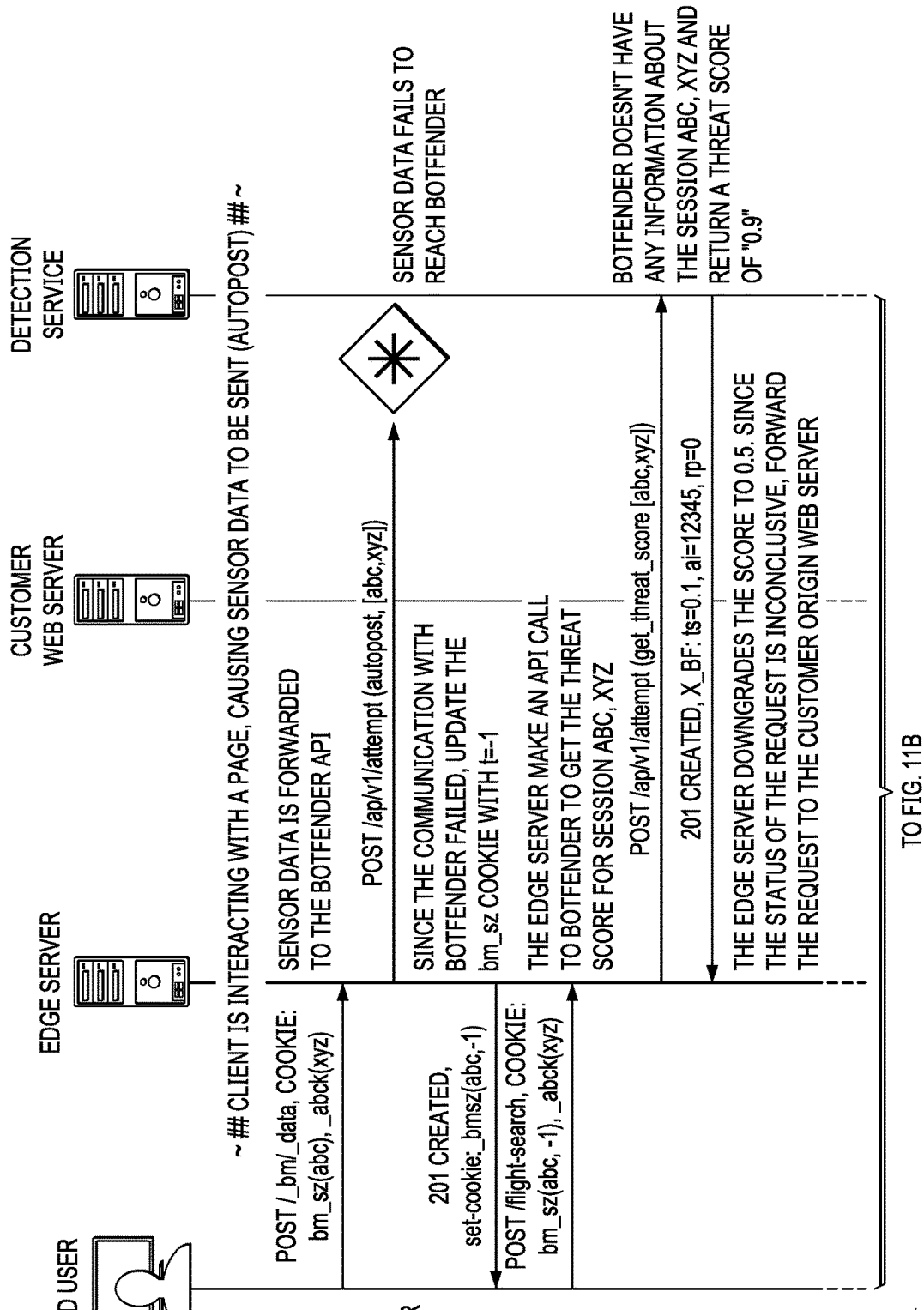
FIG. 11A and 11B depicts a representative workflow of a protocol for recovering from a failed autopost.
Figure 11B:
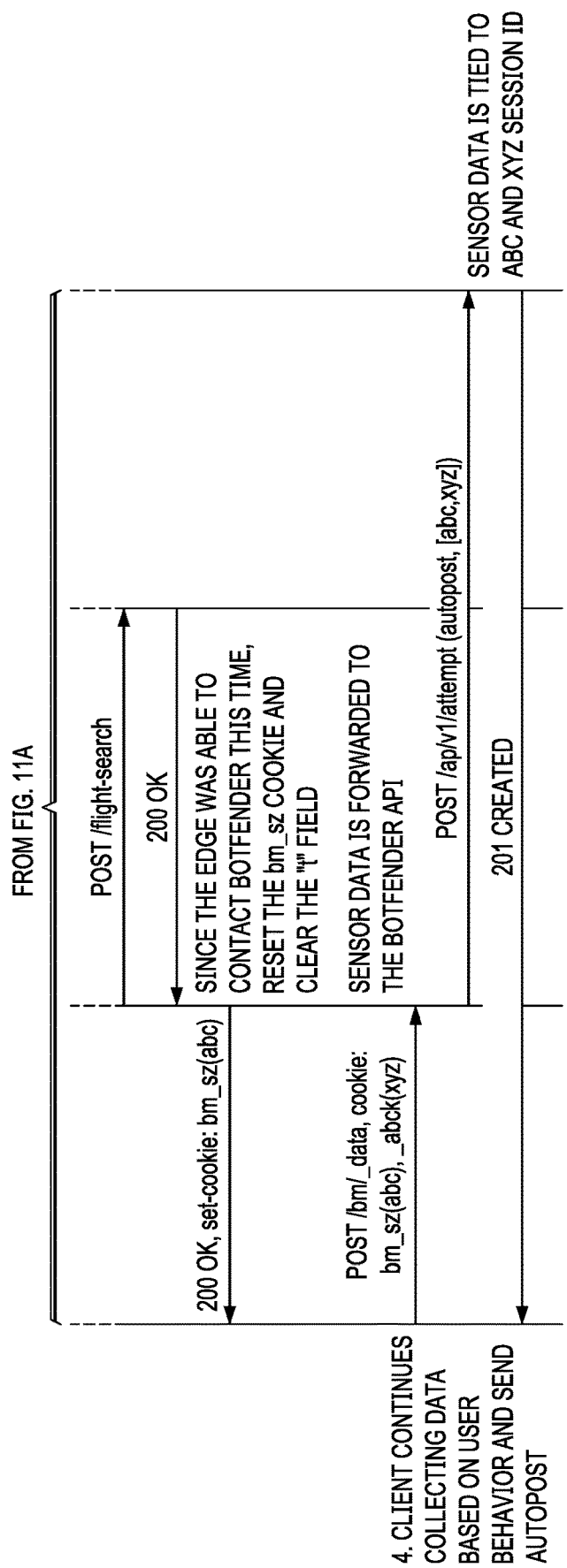

This aspect of the disclosure is depicted in FIG. 11A and 11B.

Detecting Session Cookie Replay Attacks

Cookie replay attacks are common and generally consist of a bot operator acquiring a valid human session cookie and sharing it within its botnet. Preferably, the bot detection service algorithm includes a rate limiter feature to detect this situation. In particular, the bot detection service constantly counts the number of requests that a client (bm_sz+_abck session ID) makes to protected endpoints over a certain period of time. If a session ID exceeds a certain threshold, the human score associated with the session is downgraded to a bot. The reset protocol (as described above) may also be used in this case to allow the user to prove itself once more (by providing some evidence of real user behavior). An attacker attempting such an attack may be able to get a few requests through but the rate limiter quickly flags the anomalous activity.

Resetting _abck Cookies on Demand

On rare occasions, globally resetting the long term session cookie for a given customer may be necessary to deal with severe session replay attacks that take advantage of the long term properties of the _abck cookie. To that end, preferably a control is added to the bot management configuration application to allow customers to flush and reset all _abck cookies for the hostnames associated with the endpoint protected by a given policy.

JavaScript Injection and Delivery

In a representative embodiment, a JavaScript detection method is used to protect specific sensitive workflows, such as checkout, search and login, as opposed to a generic use that helps detect scrapping activity. Because of these different purposes, the bot detection JS and browser validation JavaScript may be kept independent from each other. The following section describes an embodiment of the JS injection and delivery workflow.

CDN customers may be provided the option either to inject the JS to all base pages (this may be a default behavior) or to specify on which pages to inject the JS.

JavaScript Injection Workflow

Figure 12:
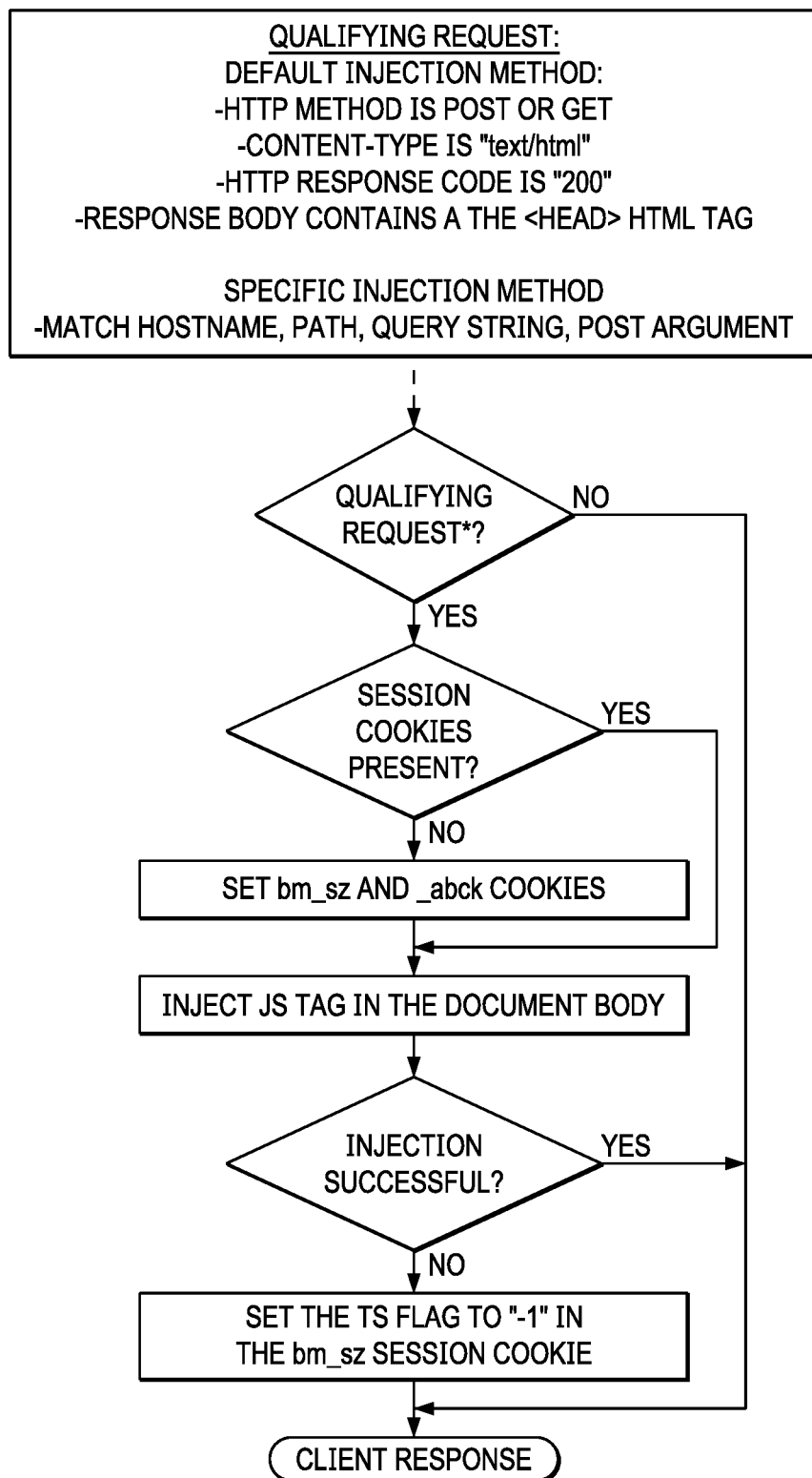
FIG. 12 depicts a script injection workflow according to this disclosure.

The workflow in FIG. 12 describes the injection process. In particular, if the request qualifies, the JavaScript tag is added to the response body before serving the content to the client. If the bot management session cookie does not exist, a new one is generated. If the injection fails, the ts field in the bm_sz session cookie is set to "−1." This indicates that an issue occurred during the execution of the workflow. In that case, if the bot detection service returns a threat score greater than a given value on the get_threat_score call on the protected request, the value is downgraded, e.g., to another intermediate value (indicating inconclusive). In other words, a failure from the edge to serve the JS need not negatively impact the user.

JavaScript Delivery Workflow

Figure 13:
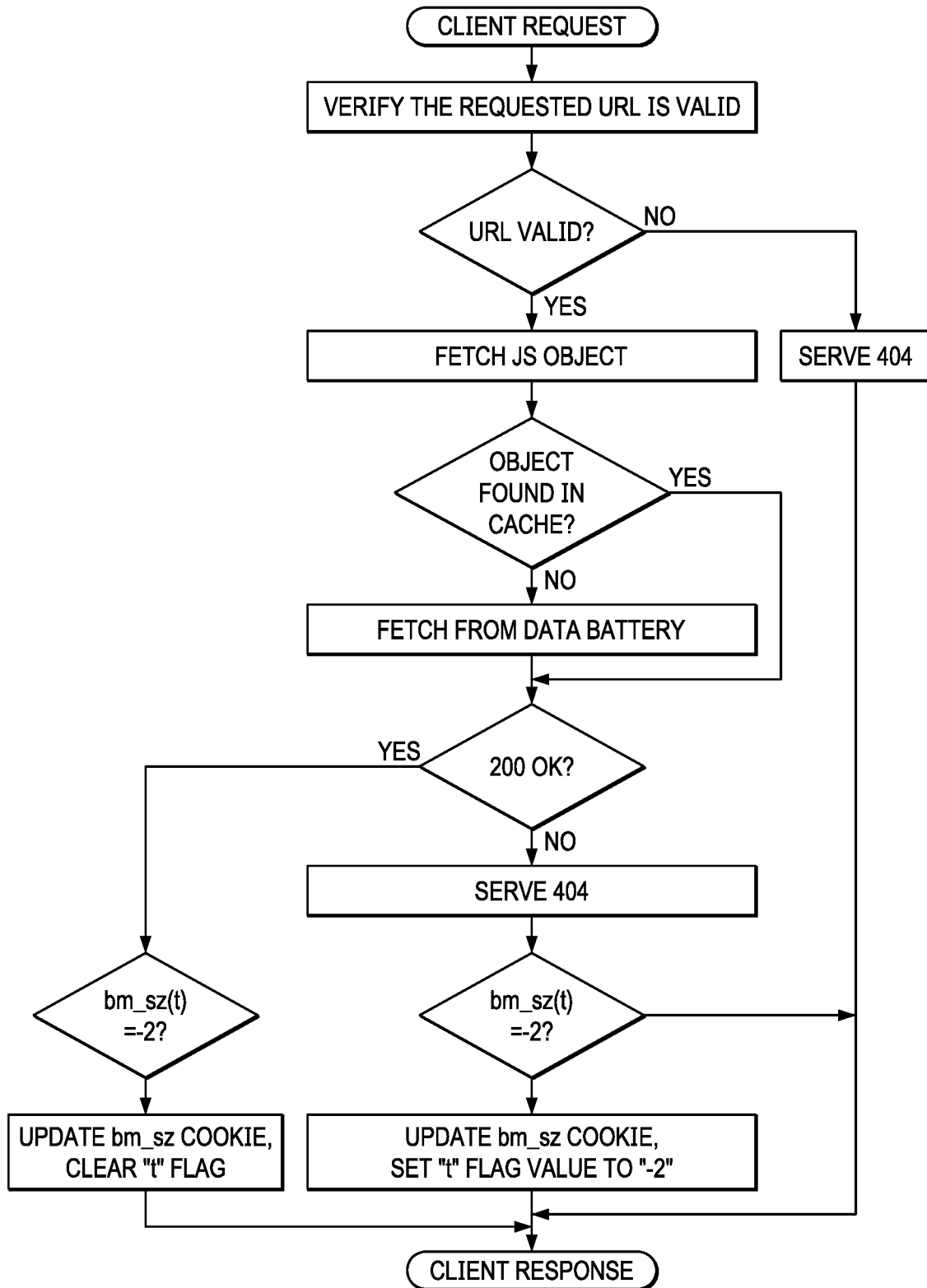
FIG. 13 depicts a script delivery workflow according to this disclosure.

When the client receives the HTML page it will parse it and request the various embedded objects including the JavaScript. When the edge server receives the request or the JavaScript, it validates the URL. If the URL is invalid, a 404 response is served to the client. If the URL is valid, the edge fetches the JS object from cache or a persistent data store. If the object is not found (404) AND bm_sz(t) is NOT equal to a given value, the bm_sz cookie is reset and the t flag is set to the given value. If the object is found (200, 304) AND bm_sz(t) is equal to the given value, the bm_sz cookie is reset and the t flag value is cleared. This JS delivery workflow is shown in FIG. 13.

Bot Detection Service API Interaction

Autopost requests are handled as described in the following section.

The request format is handled as follows. As noted, autopost requests are triggered by the client machine that runs the asynchronous JavaScript. These requests are automatically triggered based on specific behavioral action, such as a tab/enter key press, mouse click or screen touch. In one embodiment, the data is sent securely over HTTPS on a dedicated URL on the customer's site primary domain. The following describes how the edge server preferably handles these requests.

In particular, the incoming autopost request coming from the client preferably only has the sensor data field. Before forwarding the data to the bot detection API, the edge server enriches the POST body by adding several fields including the account_id, session_id and abck_cookie extracted from the bot management session cookies, referer header value, user-agent header value, request header names, IP address from the connecting IP, page/API label in case of a login API and request type. The bot detection service response processing then proceeds as follows. If the edge server fails to communicate with the service (HTTP status code is not 201 or 100), the edge server will respond to the client on behalf of the bot detection service {"success": false} and update the t field in the bm_sz cookie with a given value. If the edge server manages to successfully communicate with the bot detection service (HTTP status code is 201 or 100), and if bm_sz(t) has the appropriate values set, the bm_sz cookie is updated and the t flag is cleared. The X_BF header value also is extracted from the response to look for the sp field. Depending on its value, the sp flag is updated in the _abck cookie. If the request indicates that an origin header is present in the request, the header is added in the response to allow the client to process the cookies.

Figure 14:
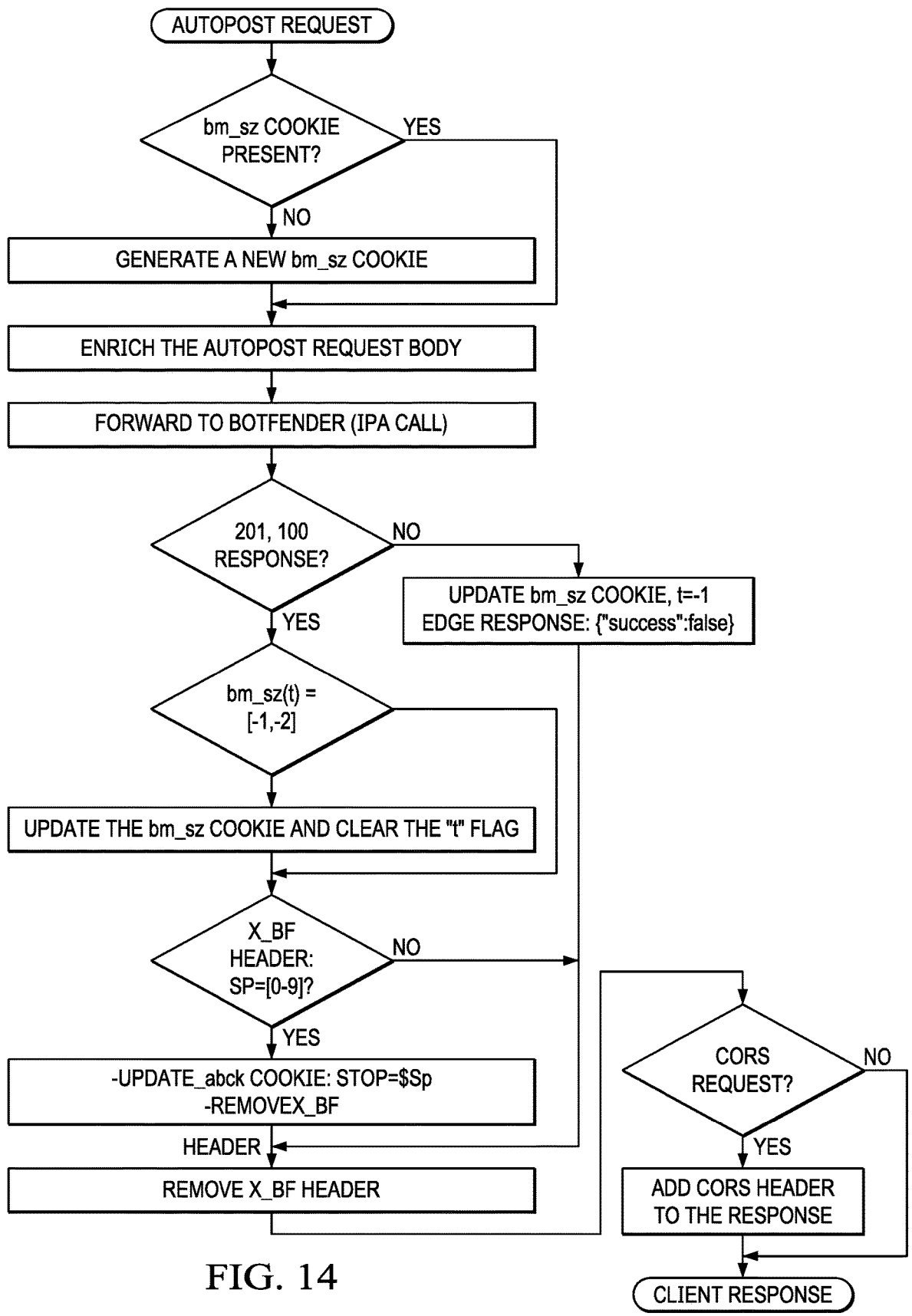
FIG. 14 depicts a workflow for handling autopost requests at an edge server according to this disclosure.

The workflow diagram in FIG. 14 illustrates how autopost requests are handled at the edge.

The request transport is handled as follows. In particular, if the digital property where the JavaScript is injected is handled by a secure network, the autopost is sent by the client over HTTPS. This section describes how the request is handled from the client to the bot detection service in this scenario. Preferably, the sensor data is sent on the primary customer hostname. In this case the Certificate Authority used is the customer's CA and the payload is encrypted using the customer's public key. The edge server intercepts the request, decrypts the payload with the customer's private key, enriches the data as described above and forwards to the bot detection service. The payload to the bot detection service is encrypted using a public key for the service. The bot detection service receives the request and decrypts it using its private key. If the digital property where the JavaScript is injected is handled by a CDN that is not secured via SSL connections, the autopost is sent by the client over HTTP. In such case, the sensor data is not sent encrypted between the client and the edge but preferably it is still sent encrypted between the edge and the bot detection service servers. In such case, the edge server intercepts the request, enriches the data and forwards to the bot detection service. The payload to the service is encrypted using the service's public key. The service receives the request and decrypts using its private key.

Handling Requests for Protected Endpoints.

The following describes a technique for session cookie validation. In particular, when the edge server receives a request, it looks for the bot management framework session cookies (bm_sz and _abck). The edge server validates them and if anomalies are found, the edge server classifies the request as a bot just like the bot detection service otherwise would. Preferably, the session cookies are validated as follows. First, the edge server looks for the bm_sz cookie. If the cookie is found, the akid_z is separated from the encrypted value, the encrypted part is decrypted, and the cookie value is validated. To this end, the various fields (_a, _d, _e, t) are extracted. By comparing _e with a current time, the edge server validates that the cookie has not expired. The _d value is used to validate the domain, and a is used to validate akid_z. The threat score is extracted from t. If the cookie is not valid, the threat score is set appropriately, the relevant bot management rule is triggered, and the corresponding action execute.

The processing continues with edge server looking for the _abck cookie. If not found, the threat score is set appropriately, the relevant bot management rule is triggered and the corresponding action is executed. If the cookie is found, the various fields (akid_a, stop_n, hash, reset_n) are extracted. The server computes the hash of (akid_a+stop_n) and compares the result with the hash value. If an anomaly is found, the threat score is set appropriately, the relevant bot management rule is triggered and the corresponding action is executed. If no anomaly is found while validating the cookies, an API call to retrieve the threat score from the bot detection service is made.

Figure 15:
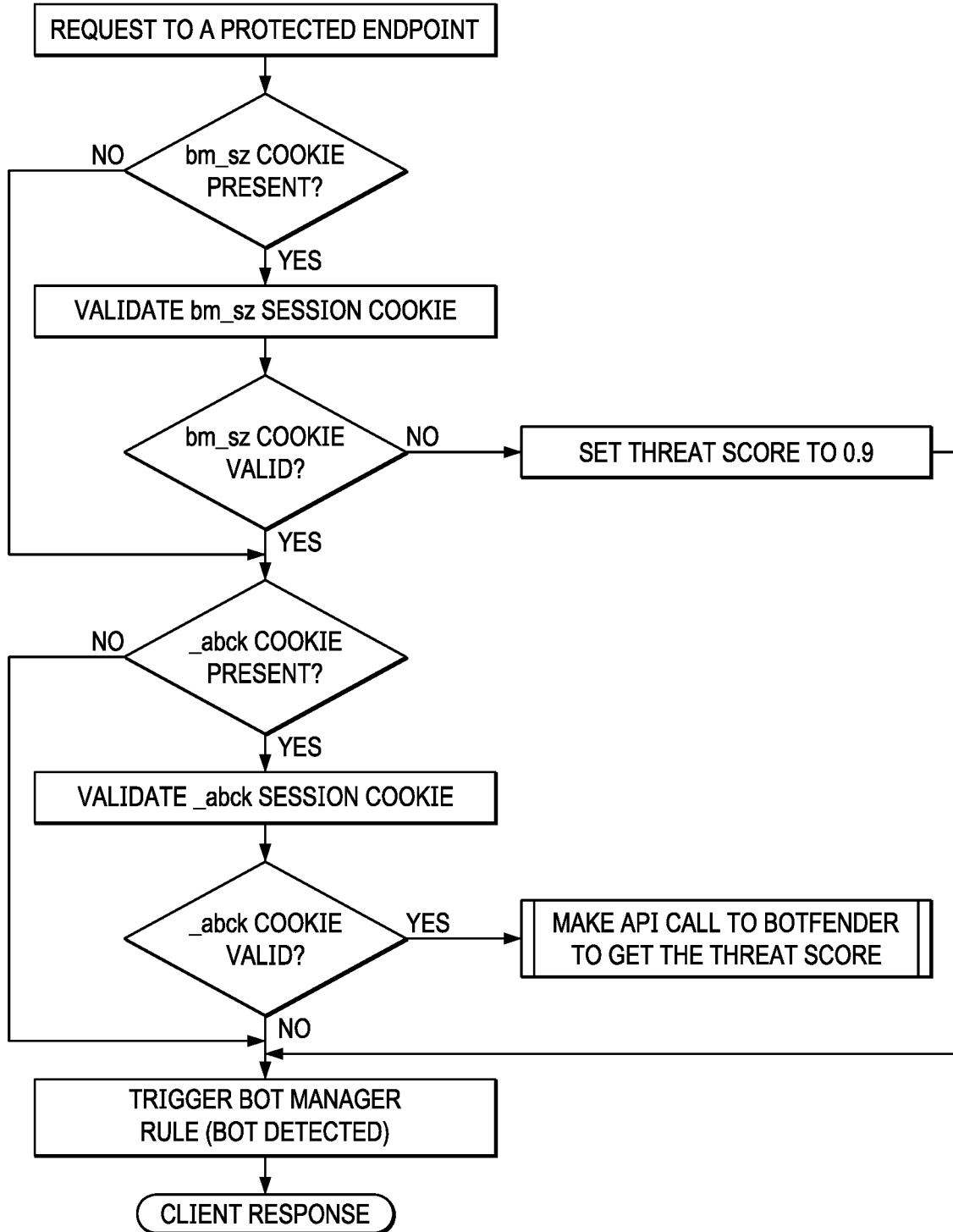
FIG. 15 depicts a session cookie validation workflow according to this disclosure.

This workflow is depicted in FIG. 15.

get_threat_score Request

Once the session cookies have been validated, the edge server makes a request to the bot detection API, e.g., using an edge service to retrieve the threat score. This section describes the logic executed at the edge to handle this type of request.

First, additional information is extracted from the request and the API call is formatted. The request-type is set to get_threat_score. The API call to the bot detection service cluster assigned to the customer is then made. If the API call fails (HTTP response is different from 201 or 100), the threat score is set appropriately. If the API call succeeds (201, 100 HTTP response), the following are extracted from the X_BF header: threat score (ts), attempt ID (ai) and threat category (threat). If is has a certain value, the client has been classified as a bot. Depending on the bm_sz cookie t flag set value, the score may be downgraded and the bot management rule "behavior evaluated inconclusive" triggered. If bm_sz(t) has some other certain value, the bm_sz cookie is updated and the t flag (this API call was successful) is cleared. If the threat score value was not downgraded, the bot relevant management rule is triggered and the associated action triggered. If ts is between a given range, the evaluation of the behavioral data was inconclusive, and the bot management rule "behavior evaluated inconclusive" is triggered. If ts is with another given range, the client has been classified as a human. If bm_sz(t) has a given value, the bm_sz cookie is updated and the t flag (this API call was successful) is cleared. The server also looks for the rp field in the X_BF header. if rp is within a given range, the rp field in the _abck cookie is updated.

Figure 16:
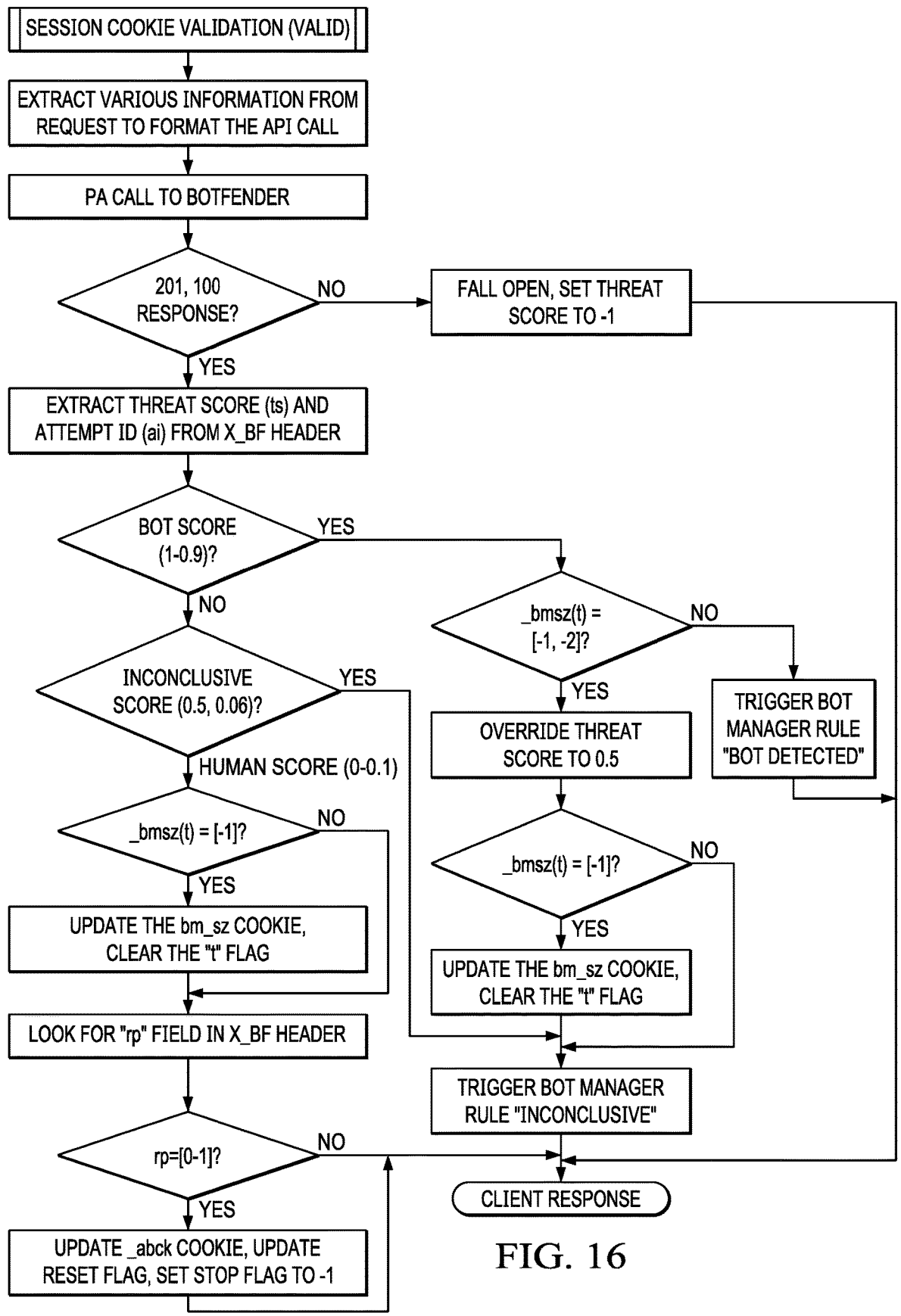
FIG. 16 depicts a workflow by which an edge server makes a request to the bot detection service API to retrieve a threat score.

The above-described workflow is depicted in FIG. 16.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed is as follows:

1. A method to integrate bot detection in association with an overlay network customer environment, comprising:
    receiving an overlay network customer configuration that includes identification of an endpoint to be protected against a bot attack;
    as a page that includes a reference to the protected endpoint is returned to a requesting client, and in an asynchronous mode of operation, injecting into the page a reference to a data collection script, the script configured to record one or more interactions at the requesting client, to collect sensor data about the interactions, and to send the collected sensor data;
    receiving and forwarding collected sensor data to a bot detection service;
    responsive to intercepting a request for the endpoint, and in a synchronous mode of operation, issuing a query to the bot detection service to obtain a threat score associated with the requesting client, the threat score based at least in part on the collected sensor data; and
    determining based at least in part on the threat score received in response to the query whether the request for the endpoint should be forwarded onward for handling.

2. The method as described in claim 1 wherein the request for the endpoint is not forwarded upon a determination that the threat score is indicative of the requesting client being a bot.

3. The method as described in claim 1 wherein the query is issued while the requesting client continues to interact with the page locally.

4. The method as described in claim 1 wherein the page is associated with an overlay network customer workflow that involves collection of sensitive data.

5. The method as described in claim 4 wherein the workflow is one of: a checkout, a search and a login.

6. The method as described in claim 1 wherein the data collection script is injected into the page by including a JavaScript tag in a response body of the page.

7. The method as described in claim 1 further including enriching the collected sensor data prior to delivering the sensor data to the bot detection service.

8. The method as described in claim 1 wherein the collected sensor data is forwarded to the bot detection service continuously as the collected sensor data is received.

9. The method as described in claim 1 wherein the collected sensor data is delivered to the bot detection service via one or more JavaScript Object Notation (JSON)-formatted POST requests.

10. The method as described in claim 9 wherein a particular JSON-formatted POST request is associated with a behavioral action occurring locally at the requesting client.

11. The method as described in claim 1 wherein the query is issued to an Application Programming Interface (API) of the bot detection service.

12. The method as described in claim 11 wherein the collected sensor data is posted asynchronously to the bot detection service via the API.

13. Apparatus, comprising:
a hardware processor;
computer memory configured to hold computer program instructions executed by the hardware processor to integrate bot detection in association with an overlay network customer environment, the computer program instructions comprising program code configured to:
receive an overlay network customer configuration that includes identification of an endpoint to be protected against a bot attack;
as a page that includes a reference to the protected endpoint is returned to a requesting client, and in an asynchronous mode of operation, inject into the page a data collection script, the script configured to record one or more interactions at the requesting client, to collect sensor data about the interactions, and to send the collected sensor data;
receive and forward collected sensor data to a bot detection service;
responsive to intercepting a request for the endpoint, and in a synchronous mode of operation, issue a query to the bot detection service to obtain a threat score and other information associated with the requesting client, the threat score based at least in part on the collected sensor data; and
determine based at least in part on the threat score whether the request for the endpoint should be forwarded onward for handling.

\* \* \* \* \*